United States Patent [19]

Yoshida et al.

[11] Patent Number: 5,734,455
[45] Date of Patent: Mar. 31, 1998

[54] REFLECTIVE BIREFRINGENT TYPE COLOR LIQUID CRYSTAL DISPLAY EMPLOYING BLACK MASK

[75] Inventors: Tetsushi Yoshida, Kanagawa-ken; Shinichi Shimomaki, Akishima, both of Japan

[73] Assignee: Casio Computer Co., Ltd., Tokyo, Japan

[21] Appl. No.: 438,497

[22] Filed: May 10, 1995

[30] Foreign Application Priority Data

| May 12, 1994 | [JP] | Japan | 6-098737 |
| May 23, 1994 | [JP] | Japan | 6-108458 |
| May 18, 1994 | [JP] | Japan | 6-103938 |
| May 18, 1994 | [JP] | Japan | 6-103939 |
| May 19, 1994 | [JP] | Japan | 6-105348 |
| May 19, 1994 | [JP] | Japan | 6-105349 |

[51] Int. Cl.$^6$ .............................. G02F 1/1335
[52] U.S. Cl. .............................. 349/99; 349/113
[58] Field of Search .............................. 359/59, 70, 113, 359/38; 349/99

[56] References Cited

U.S. PATENT DOCUMENTS

| 5,139,340 | 8/1992 | Okumura | 359/63 |
| 5,204,765 | 4/1993 | Mitsui et al. | 359/70 |
| 5,361,151 | 11/1994 | Sonehara et al. | 359/65 |
| 5,559,615 | 9/1996 | Takei et al. | 357/50 |
| 5,619,356 | 4/1997 | Kozo et al. | 349/99 |

*Primary Examiner*—William L. Sikes
*Assistant Examiner*—Charles Miller
*Attorney, Agent, or Firm*—Frishauf, Holtz, Goodman, Langer & Chick

[57] ABSTRACT

A color liquid crystal display device includes a first substrate having a surface on which a transparent electrode and a first aligning film covering the transparent electrode are arranged, a second substrate having an electrode arranged to oppose the first substrate, and a second aligning film covering the electrode, the electrode having a plurality of pixels formed on its inner surface, and the pixels being formed in an area opposing the transparent electrode, a liquid crystal layer sandwiched between the first and second substrates and having an initial aligned state in which liquid crystal molecules are aligned in a predetermined direction by the first and second aligning films, a polarizing member arranged outside the first substrate such that the polarization axis of the polarizing member crosses an aligning direction of liquid crystal molecules adjacent to the first aligning film at an angle other than a right angle, and a reflecting member, arranged on the second substrate side, for reflecting light which is incident from the polarizing member on the first substrate side and transmitted through the liquid crystal layer. Active elements formed in correspondence with the plurality of pixel electrodes and respectively connected thereto, and compensation capacitor means, connected to the active elements to be parallel with the pixel electrodes, for compensating for variations in voltages applied between the pixel electrodes and the counter electrode are arranged on the inner surface of the first or second substrate.

23 Claims, 12 Drawing Sheets

REFLECTIVE BIREFRINGENT TYPE COLOR LIQUID CRYSTAL DISPLAY EMPLOYING BLACK MASK

BACKGROUND OF THE INVENTION

1. Field of the Invention

The present invention relates to a reflection type color liquid crystal display device for displaying a plurality of colors with the birefringence action of a liquid crystal layer.

2. Description of the Related Art

As a conventional active matrix liquid crystal display device, a device of a TN (twisted nematic) scheme is used.

An active matrix liquid crystal display device of this TN scheme comprises an active matrix liquid crystal cell having liquid crystal molecules twisted/aligned at a twist angle of almost 90°, and a pair of polarizing plates arranged to sandwich the liquid crystal cell. The pair of polarizing plates are arranged such that their transmission axes are perpendicular or parallel to each other, and the transmission axis is almost perpendicular or parallel to the liquid crystal molecule aligning direction on one substrate of the liquid crystal cell.

In the active matrix liquid crystal cell, a plurality of transparent pixel electrodes and a plurality of active elements (e.g., thin-film transistors) corresponding to the respective pixel electrodes are arranged, in the form of a matrix, on the inner surface of one of the pair of transparent substrates opposing each other via the liquid crystal layer, and a transparent counter electrode opposing each pixel electrode is formed on the inner surface of the other substrate. The aligning directions of the liquid crystal molecules are restricted by aligning films respectively formed on the electrode formation surfaces of the two substrates, and the liquid crystal molecules are twisted/aligned between the substrates at a twist angle of almost 90°. Note that a nematic liquid crystal having a positive dielectric anisotropy is used as the above liquid crystal.

In this active matrix liquid crystal cell, a capacitor electrode is formed on the rear side of each pixel electrode on one substrate to oppose an edge portion of the pixel electrode through an insulating film, and a compensation capacitor (storage capacitor) for compensating for the voltage held in the pixel during a non-selection period is constituted by this capacitor electrode, the pixel electrode, and the insulating film formed therebetween.

According to the liquid crystal display device of the TN scheme, external light is linearly polarized by the polarizing action of one polarizing plate first and is then incident on the liquid crystal cell, and emergence of light passing through the liquid crystal cell is controlled by the analyzing action of the other polarizing plate, thereby performing a display operation. While no ON voltage is applied between the electrodes on the two substrates of the liquid crystal cell, i.e., the liquid crystal molecules are twisted/aligned, linearly polarized light incident on the liquid crystal cell emerges from the liquid crystal cell after the polarization direction of the linearly polarized light is shifted by almost 90°. This linearly polarized light is transmitted through or absorbed by the other polarizing plate, resulting in a bright or dark display.

When an ON voltage is applied between the electrodes of the liquid crystal cell, the liquid crystal molecules are aligned almost vertically with respect the substrate surfaces. As a result, linearly polarized light incident on the liquid crystal cell emerges from the liquid crystal cell without being polarized. This linearly polarized light is transmitted through or absorbed by the other polarizing plate, resulting in a bright or dark display.

Liquid crystal display devices include a transmission type device and a reflection type device having a reflecting plate arranged on the rear surface. In a reflection type liquid crystal display device, light incident from the front surface side passes through the polarizing plate on the front surface side, the liquid crystal cell, and the polarizing plate on the rear surface side and is reflected by the above reflecting plate. The light passes through the polarizing plate on the rear surface side, the liquid crystal cell, and the polarizing plate on the front surface side again and emerges from the device.

Some of the active matrix liquid crystal display devices of the above TN scheme are designed to display multicolor images. In a color liquid crystal display device for displaying a color image, filters of a plurality of colors, e.g., red, green, and blue color filters, are arranged on one substrate of the above liquid crystal cell in correspondence with each pixel electrode.

Since the above conventional color liquid crystal display device is designed to color light by using color filters, the luminance of colored light is low, and hence the display is dark.

Such a dark display is caused by absorption of light in the color filters. Each color filter absorbs not only light outside a wavelength range corresponding to the color of the filter but also light in the wavelength range at a considerably high absorption index. For this reason, light colored by the color filter is much smaller in light amount than light which falls within the wavelength range and is to be incident on the color filter. As a result, a dark display is caused. In addition, such a dark display is obtained because one color is displayed by three pixels.

Furthermore, in a reflection type liquid crystal display device as one of the above conventional liquid crystal display devices, light which is incident from the front surface side of the liquid crystal cell, when viewed from an observer, passes through the front polarizing plate, the liquid crystal cell, and the rear polarizing plate and is reflected by the above reflecting plate. The light passes through the rear polarizing plate, the liquid crystal cell, and the front polarizing plate again and emerges from the device. That is, in this process, the light passes through the two substrates of the liquid crystal cell and the front and rear polarizing plates twice. For this reason, a large light amount loss is caused by light absorption in these substrates and polarizing plates, resulting in a darker display.

As described above, in an active matrix liquid crystal cell, a capacitor electrode is formed on the rear side of each pixel electrode on one substrate via an insulating film to oppose an edge portion of the pixel electrode, and a compensation capacitor for a pixel is constituted by the capacitor electrode, the pixel electrode, and the insulating film formed therebetween. However, in the conventional liquid crystal display device, a sufficient capacitance cannot be ensured for the compensation capacitor.

In general, the above capacitor electrode consists of a metal such as a Cr (chromium)-Al (aluminum) alloy. In the conventional liquid crystal display device, light which is incident from the front surface side sequentially passes through the front substrate, the liquid crystal cell, and the rear substrate and is reflected by the reflecting plate. This reflected light sequentially passes through the rear substrate, the liquid crystal cell, and the front substrate and emerges from the device. For this reason, of the light incident on the liquid crystal cell, light incident on a portion where the above capacitor electrode is formed is blocked by the capacitor electrode.

The capacitance of the above compensation capacitor increases with an increase in area of a portion where the above capacitor electrode and the pixel electrode oppose each other. In the above conventional liquid crystal display device, however, as a capacitor increases in size, the light-transmitting area of a corresponding pixel portion decreases. For this reason, the opening ratio of the liquid crystal display device decreases, and the brightness of the display decreases.

In a conventional liquid crystal display device, therefore, the size of a capacitor electrode is determined in consideration of the opening ratio. For this reason, a sufficient capacitance cannot be ensured for a compensation capacitor. Consequently, the voltage held in a pixel during a non-selection period changes to cause a flicker in the display.

SUMMARY OF THE INVENTION

It is an object of the present invention to provide a reflection type active matrix color liquid crystal display device which can obtain high-luminance colored light by coloring light without using any color filters, display a plurality of colors with one pixel, provide a brighter display by reducing the light amount loss due to light absorption in the substrates of the liquid crystal cell and the polarizing plate, increase the opening ratio and contrast, and ensure a sufficient capacitance for each compensation capacitor.

In order to achieve the above object, according to the first aspect of the present invention, there is provided a color liquid crystal display device comprising: a pair of substrates arranged to oppose each other; a plurality of pixel electrodes formed on an inner surface of one of the pair of substrates in the form of a matrix; active elements formed on the inner surface of one of the pair of substrates in correspondence with the respective pixel electrodes and respectively connected thereto; at least one counter electrode formed on an inner surface of the other of the pair of substrates to oppose the pixel electrodes; compensation capacitor means, formed on the inner surface of one of the pair of substrates and connected to the active elements to be parallel with the pixel electrodes, for compensating for variations in voltages applied between the pixel electrodes and the counter electrode; aligning films respectively formed on the inner surface of one substrate, on which the plurality of pixel electrodes are formed, and the inner surface of the other substrate, on which the counter electrode is formed, so as to cover the electrodes; a liquid crystal layer sandwiched between the pair of substrates and having an initial aligned state in which liquid crystal molecules are aligned in a predetermined direction by the aligning films; at least one polarizing member arranged outside at least one of the pair of substrates such that a transmission axis of the polarizing member crosses an aligning direction of liquid crystal molecules adjacent to the aligning film formed on an adjacent substrate side at an angle other than a right angle; and a reflecting member, arranged on a substrate side where light incident from the polarizing member side of one of the pair of substrate emerges, for reflecting light transmitted through the liquid crystal layer.

In the above color liquid crystal display device, each compensation capacitor means constituted by a pixel electrode and a capacitor electrode opposing the pixel electrode through an insulating film. In this liquid crystal display device, the reflecting member is preferably arranged on the inner surface of one of the pair of substrates. In this case, each pixel electrode is made of a transparent conductive film, and each compensation capacitor means includes a capacitor electrode made of a metal film having light-reflecting characteristics. The capacitor electrode also serves as a reflecting member. The reflecting member is preferably made of a metal film having a reflecting surface. As a reflecting member, a pixel or counter electrode made of a metal film as a reflecting member may be formed. In this case, a light-scattering film for scattering light transmitted therethrough is preferably formed on the surface of the polarizing member. Furthermore, a retardation plate is preferably arranged between the polarizing member and the substrate. The compensation capacitor means comprises a capacitor electrode formed on a gate insulating film on the active element, a pixel electrode, and an insulating film formed therebetween to protect the active element. Alternatively, the compensation capacitor means comprises a first capacitor electrode formed on the substrate, a gate insulating film covering the first capacitor electrode, and a second capacitor electrode connected to one of the source and drain electrodes formed on the gate insulating film to which the pixel electrode is connected.

According to the liquid crystal display device of the present invention, the polarized state of light incident through the polarizing plate is changed by the birefringence action of the liquid crystal layer of the liquid crystal cell in the process of passage of the light therethrough. The light is reflected by the inner surface of the rear substrate of the liquid crystal cell and passes through the liquid crystal layer again. In this process, the polarized state of the light is changed again. The light is then incident on the polarizing plate, and polarized light transmitted through the polarizing plate is colored and emerges from the device.

That is, this liquid crystal display device is designed to color light by using the birefringence action of the liquid crystal layer of the liquid crystal cell and the polarizing and analyzing actions of the polarizing plate without using any color filters. In the liquid crystal display device, high-luminance colored light can be obtained because the amount of colored light which is transmitted through the polarizing plate and emerges from the device is almost equal to the amount of light, of linearly polarized light incident through the polarizing plate, which is in the wavelength range corresponding to the colored light.

In addition, in this liquid crystal display device, the aligned state of liquid crystal molecules changes in accordance with the magnitude of a voltage applied between the electrodes of the liquid crystal cell, and the birefringence characteristics of the liquid crystal layer change accordingly. For this reason, the color of the above colored light can be changed by controlling the voltage applied to the liquid crystal cell. Therefore, a plurality of colors can be displayed with one pixel.

This liquid crystal display device is of a reflection type. However, since a reflecting film is formed on the inner surface of the rear substrate of the liquid crystal cell, and light is reflected by this reflecting film. For this reason, light passes through only the front substrate of the two substrates of the liquid crystal cell. In addition, only one polarizing plate is used. Therefore, the light amount loss due to light absorption in the substrates of the liquid crystal cell and the polarizing plate can be reduced to provide a brighter display.

Furthermore, in this liquid crystal display device, the reflecting film is formed, via a transparent insulating film, on the rear side of each pixel electrode arranged on the inner surface of the rear substrate of the liquid crystal cell, and a compensation capacitor for a pixel is constituted by the reflecting film, the pixel electrode, and the insulating film formed therebetween. Also, the reflecting film is formed in a size corresponding to almost the entire surface of the pixel electrode. Therefore, the opening ratio can be increased, and a sufficient capacitance can be ensured for each compensation capacitor.

In the liquid crystal display device of the present invention, since a retardation plate is arranged between the liquid crystal cell and the polarizing plate, the polarized state of light which is incident through the polarizing plate can be changed by the birefringence action of the retardation plate while the light passes through the liquid crystal layer of the liquid crystal cell and is incident on the polarizing plate again. Therefore, vivid colored light can be obtained.

According to the second aspect of the present invention, there is provided a color liquid crystal display device comprising: a first substrate having a surface on which a transparent electrode and a first aligning film covering the transparent electrode are arranged; a second substrate having an electrode arranged to oppose the first substrate, and a second aligning film covering the electrode, the electrode having a plurality of pixels formed on an inner surface thereof, and the pixels being formed in an area opposing the transparent electrode; a liquid crystal layer sandwiched between the first and second substrates and having an initial aligned state in which liquid crystal molecules are aligned in a predetermined direction by the first and second aligning films; a polarizing member arranged outside the first substrate such that a polarization axis of the polarizing member crosses an aligning direction of liquid crystal molecules adjacent to the first aligning film at an angle other than a right angle; a reflecting member, arranged on the second substrate side, for reflecting light which is incident from the polarizing member on the first substrate side and transmitted through the liquid crystal layer; and light-shielding members, arranged on the inner surface side of one of the first and second substrates, for preventing leakage of light between the plurality of pixels.

In this liquid crystal display device, the light-shielding member is formed on the inner surface of one of the pair of substrates. If the liquid crystal display device is of an active matrix type, active elements and pixel electrodes may be formed on the inner surface of the substrate on which light is incident, and the light-shielding member may be formed on the inner surface of one or the other substrate. Alternatively, active elements and pixel electrodes may be formed on the inner surface of the substrate from which light emerges, and the light-shielding member may be formed on the inner surface of one or the other substrate. Also, in this liquid crystal display device, compensation capacitors are preferably connected to the active elements to be parallel to the pixel electrodes. In addition, a light-scattering film may be formed on the surface or the like of the polarizing plate. Instead of this light-scattering film, an electrode including mirror-surface portions and small areas for a light-scattering function may be used as a pixel electrode or a counter electrode. Furthermore, a retardation plate may be arranged between the polarizing plate and the liquid crystal cell.

According to this liquid crystal display device, the light amount loss due to light absorption in the substrates of the liquid crystal cell and the polarizing plate can be reduced, and the opening ratio can be increased to provide a bright display, although the device is of a reflection type.

In addition, in this liquid crystal display device, since black masks are arranged on the inner surface of one of the substrates of the liquid crystal cell in correspondence with the gaps between the respective pixel electrodes arranged on the rear substrate, the contrast between the respective pixel electrodes can be sharpened to display a high-quality image.

Furthermore, in the above liquid crystal display device, since the thin-film transistors arranged on the rear substrate of the liquid crystal cell are covered with the pixel electrodes also serving as reflecting films, the thin-film transistors are not exposed to light. Therefore, areas corresponding to the thin-film transistors need not be shielded by the above black masks.

The accompanying drawings, which are incorporated in and constitute a part of the specification, illustrate presently preferred embodiments of the invention and, together with the general description given above and the detailed description of the preferred embodiments given below, serve to explain the principles of the invention.

BRIEF DESCRIPTION OF THE DRAWINGS

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

DETAILED DESCRIPTION OF THE PREFERRED EMBODIMENTS

[First Embodiment]

Figure 1:
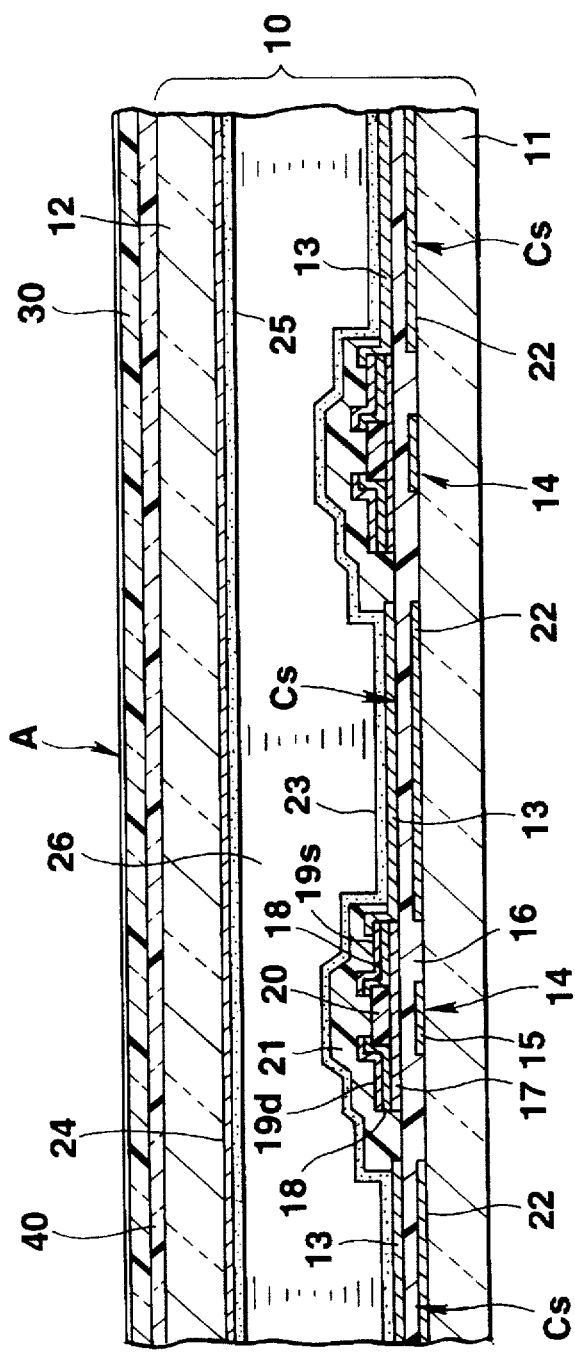
FIG. 1 is a sectional view showing part of a liquid crystal display device according to the first embodiment of the present invention.

FIG. 1 is a sectional view showing part of an active matrix color liquid crystal display device according to the first embodiment of the present invention.

This liquid crystal display device comprises a liquid crystal cell 10, one polarizing plate 30, and one retardation plate 40. The polarizing plate 30 is arranged on the front side of the liquid crystal cell 10. The retardation plate 40 is arranged between the liquid crystal cell 10 and the polarizing plate 30.

The liquid crystal cell 10 will be described first. This liquid crystal cell 10 is an active matrix cell. In this embodiment, the liquid crystal cell 10 is designed such that the molecules of a liquid crystal 26 are twisted/aligned between two substrates 11 and 12.

Of the pair of substrates 11 and 12 opposing each other via the liquid crystal layer of the liquid crystal cell 10, the rear substrate (lower substrate in FIG. 1) 11 is an insulating substrate (need not be transparent) constituted by a glass plate or the like. A plurality of transparent pixel electrodes 13, each consisting of ITO or the like, and a plurality of active elements 14 corresponding to the respective pixel electrodes 13 are arranged on the inner surface, i.e., the surface opposing the liquid crystal layer, of the rear substrate 11 in the row and column directions in the form of a matrix. A transparent aligning film 23 is formed on the pixel electrodes 13.

For example, the above active elements 14 are TFTs (thin-film transistors). Each TFT 14 comprises a gate electrode 15 formed on the substrate 11, an i-type semiconductor film 17 consisting of a-Si (amorphous silicon) or the like and formed on a gate insulating film 16 to oppose the gate electrode 15, and source and drain electrodes 19s and 19d formed on two side portions of the i-type semiconductor film 17 via n-type semiconductor films 18 consisting of a-Si or the like doped with an impurity. The active elements 14 are covered with protective insulating films 21.

Reference numeral 20 denotes a blocking insulating film formed on the channel region of the i-type semiconductor film 17. The blocking insulating film 20 serves to protect the i-type semiconductor film 17 when the n-type semiconductor films 18 are patterned.

The gate insulating film 16 of the TFT 14 is a transparent insulating film consisting of SiN (silicon nitride) or the like. This gate insulating film 16 is formed on almost the entire surface of the substrate 11.

Although not shown, a gate line (address line) and a data line are arranged on the rear substrate 11. The gate line serves to supply a gate signal to the gate electrode 15 of the TFT 14, whereas the data line serves to supply a data signal corresponding to image data to the drain electrode 19d of the TFT 14.

The above gate line is integrally formed with the gate electrode 15 of the TFT 14 on the substrate 11. The gate line is covered with the gate insulating film 16 except the terminal portion. The above data line is formed on the gate insulating film 16 and connected to the drain electrode 19d of the TFT 14.

The pixel electrodes 13 are formed on the gate insulating film 16. One end portion of each of the pixel electrodes 13 is connected to the source electrode 19s of a corresponding one of the TFTs 14.

A reflecting film 22 is formed on the rear side of each pixel electrode 13 to oppose almost the entire surface of the pixel electrode 13 via the gate insulating film 16. This reflecting film 22 is formed by using the same metal film as the gate electrode 15 of the TFT 14 and the gate line described above. The reflecting film 22, the gate electrode 15, and the gate line are simultaneously formed as follows. A metal film, e.g., an Al alloy, having a high reflectance is formed first on the substrate 11 by a sputtering apparatus or the like. This metal film is then patterned by a photolithographic method.

The reflecting film 22 also serves as a capacitor electrode. The reflecting film 22, the pixel electrode 13, and the gate insulating film 16 constitute a compensation capacitor Cs for compensating for the voltage held in a pixel during a non-selection period.

The above reflecting film 22 is connected to the gate line of a TFT corresponding to a pixel electrode on a preceding row of the pixel electrode 13 (i.e., on a preceding row to be selected) to which the reflecting film 22 opposes, or a capacitor line (formed by using the same metal film as the reflecting film 22, although not shown) arranged on the rear substrate 11 to be parallel to the gate line. Each reflecting film 22 is connected to a reference potential via the above gate or capacitor line.

The front substrate (upper substrate in FIG. 1) 12 is a transparent substrate constituted by a transparent glass, a transparent resin film or the like (a glass plate in FIG. 1). A transparent counter electrode 24 opposing all the pixel electrodes 13 on the rear substrate 11 is formed on the inner surface, i.e., the surface opposing the liquid crystal layer, of the front substrate 12. A transparent aligning film 25 is formed on the counter electrode 24. Note that the counter electrode 24 is an electrode in the form of a single film or divided films, which oppose all the pixel electrodes on the rear substrate 11.

Although not shown, the rear and front substrates 11 and 12 are joined to each other at their outer peripheral portions via a frame-like seal member. The liquid crystal 26 is filled in the area surrounded by the seal member between the two substrates 11 and 12.

The liquid crystal 26 is a nematic liquid crystal having a positive dielectric anisotropy. The aligning directions of the molecules of the liquid crystal 26 on the substrates 11 and 12 are restricted by aligning films 23 and 25 formed on the two substrates 11 and 12 so as to be twisted/aligned between the substrates 11 and 12. Note that each of the aligning films 23 and 25 is a horizontal aligning film consisting of polyimide or the like, and its film surface has undergone aligning treatment by rubbing.

Figure 2:
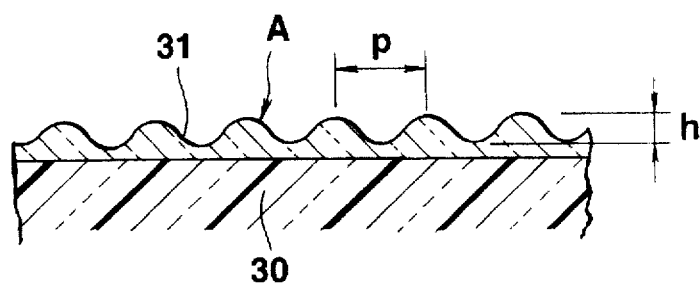
FIG. 2 is an enlarged sectional view showing a light-scattering surface of the liquid crystal display device in FIG. 1.

The polarizing plate 30 is a polarizing plate having one surface, e.g., a front surface, formed into a light-scattering surface. As indicated by the partial sectional view in FIG. 2, the light-scattering surface A is constituted by a transparent film 31 having small corrugations on the front surface of the polarizing plate 30.

The transparent film 31 consists of a resin, e.g., acrylic resin, having a high transmittance. This transparent film 31 is formed by one of the following methods: a method of transferring/printing a resin material on the surface of the polarizing plate 30 by using a printing plate having small corrugations and hardening the resin material; a method of coating the above resin material on the surface of the polarizing plate 30 to a uniform thickness, forming corrugations by embossing, and hardening the resin material; and a method of coating the above resin material containing transparent particles consisting of silica or the like on the surface of the polarizing plate 30, and hardening the material.

An average height of corrugations (an average difference in height between recessed surfaces and projected surfaces) h of the transparent film 31 is 1 to 5 μm; an average pitch p of the corrugations, 5 to 40 μm; and the haze value of the light-scattering surface A, 9 to 14%.

The above haze value is a value measured by an integrating sphere type transmittance meter (hazemeter) conforming to JIS K 6714. This haze value is calculated by the following equations:

total light transmittance: $Tt$ (%)=$T2/T1$ parallel light transmittance: $Tp$ (%)=$Tt-Td$ diffusion transmittance: $Td$ (%)=[$T4-T3\times(T2/T1)$]/$T1$ haze value: $H$ (%)=($Td/Tt$)×100

T1: incident light amount
T2: total transmitted light amount
T3: diffused light amount measured by measuring instrument
T4: diffused light amount measured by using test sample (transparent film 31) and measuring instrument The retardation plate 40 is constituted by a uniaxially stretched film as of polycarbonate. The retardation plate 40 is arranged between the liquid crystal cell 10 and the polarizing plate 30 arranged on the front surface side of the liquid crystal cell 10 in such a manner that the phase delay axis (stretching axis) of the retardation plate 40 is obliquely shifted from the transmission axis of the polarizing plate 30 by a predetermined angle. Note that the retardation plate 40 is bonded to the front surface of the liquid crystal cell 10 (the outer surface of the front substrate 12). The polarizing plate 30 is bonded to the front surface of the retardation plate 40.

In the liquid crystal display device of this embodiment, the aligning directions of the liquid crystal molecules on the two substrates 11 and 12 of the liquid crystal cell 10 (i.e., the rubbing directions of the aligning films 23 and 25), the direction of the transmission axis of the polarizing plate 30, and the direction of the phase delay axis of the retardation plate 40 are set as follows.

In this embodiment, the liquid crystal molecule aligning direction on the rear substrate 11 of the liquid crystal cell 10 is defined as a direction at an azimuth of 0°, and the liquid crystal molecule aligning direction on the front substrate 12 of the liquid crystal cell 10, the transmission axis direction of the polarizing plate 30, and the phase delay axis direction of the retardation plate 40 are set at an azimuth of 0° with reference to this direction.

Figure 3A:
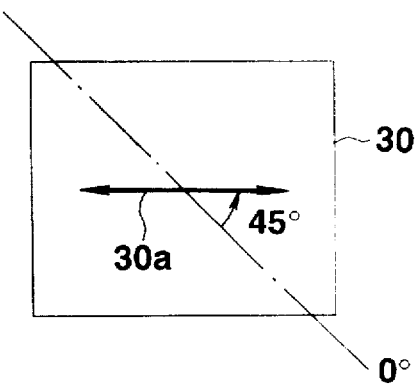
FIGS. 3A, 3B, and 3C are plan views respectively showing the transmission axis of a polarizing plate, the phase delay axis of a retardation plate, and the liquid crystal molecule aligning directions of a liquid crystal layer.
Figure 3B:
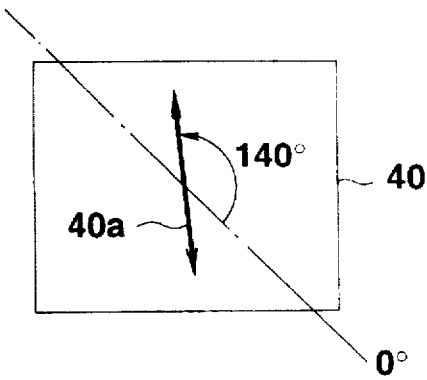
Figure 3C:
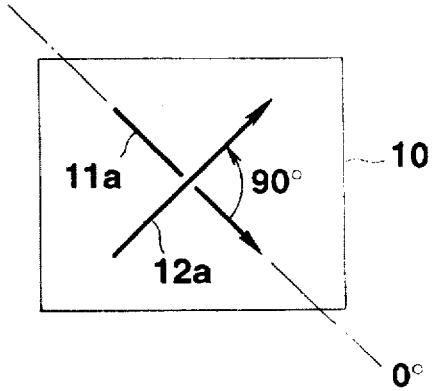

FIGS. 3A, 3B, and 3C are plan views respectively showing the transmission axis of the polarizing plate 30, the phase delay axis of the retardation plate 40, and the liquid crystal molecule aligning directions of the liquid crystal cell 10 in the above liquid crystal display device. Referring to FIG. 3C, reference numeral 11a denotes a liquid crystal molecule aligning direction on the rear substrate 11 of the liquid crystal cell 10; and 12a, a liquid crystal molecule aligning direction on the front substrate 12.

As shown in FIG. 3C, the liquid crystal molecule aligning direction 12a on the front substrate 12 of the liquid crystal cell 10 is shifted counterclockwise from the liquid crystal molecule aligning direction 11a, i.e., the direction of an azimuth of 0°, on the rear substrate 11 by almost 90° when viewed from the front surface side, and the liquid crystal molecules are twisted/aligned between the two substrates 11 and 12 at a twist angle of almost 90°.

Referring to FIG. 3A, reference numeral 30a denotes the transmission axis of the polarizing plate 30. The transmission axis 30a of the polarizing plate 30 is shifted counterclockwise from the direction at an azimuth of 0° by almost 45° when viewed from the front surface side. That is, the transmission axis 30a of the polarizing plate 30 is obliquely shifted from the liquid crystal molecule aligning direction 11a on the rear substrate 11 of the liquid crystal cell 10 by almost 45°.

Referring to FIG. 3B, reference numeral 40a denotes the phase delay axis of the retardation plate 40. The phase delay axis 40a of the retardation plate 40 is shifted counterclockwise from the direction of an azimuth of 0° by almost 140° when viewed from the front surface side. That is, the phase delay axis 40a of the retardation plate 40 is obliquely shifted counterclockwise from the transmission axis 30a of the polarizing plate 30 by almost 95° when viewed from the front surface side.

This liquid crystal display device is of a reflection type, which performs a display operation by using external light such as natural light or indoor illumination light. External light incident from the front surface side of the device passes through the polarizing plate 30 and the retardation plate 40 to be incident on the liquid crystal cell 10. The light passing through the liquid crystal layer is reflected by the reflecting film 22 formed on the inner surface of the rear substrate 11 of the liquid crystal cell 10 to pass through the liquid crystal layer and the retardation plate 40 again to be incident on the polarizing plate 30. The light transmitted through the polarizing plate 30 then emerges from the front surface side of the liquid crystal display device.

In this liquid crystal display device, the reflecting film 22 is formed on the inner surface of the rear substrate 11 of the liquid crystal cell 10 so that light incident from the front surface side of the liquid crystal cell 10 can be reflected by the reflecting film 22 on the inner surface of the rear substrate 11. In addition, the single polarizing plate 30 is formed on only the front surface side of the liquid crystal cell 10 to allow the polarizing plate 30 to have both a polarizing action for linearly polarizing incident light and an analyzing action for controlling emergence of light.

The display operation of the above liquid crystal display device will be described. In this liquid crystal display device, since the phase delay axis 40a of the retardation plate 40 is obliquely shifted from the transmission axis 30a of the polarizing plate 30, linearly polarized light incident through the polarizing plate 30 is polarized into elliptically polarized light by the birefringence action of the retardation plate 40 in the process of passing through the retardation plate 40. The polarized state of this elliptically polarized light is further changed by the birefringence action of the liquid crystal layer of the liquid crystal cell 10 in the process of passage of the light through the liquid crystal layer. At the same time, the light is reflected by the inner surface of the rear substrate 11 of the liquid crystal cell 10 to pass through the liquid crystal layer and the retardation plate 40 again. In this process, the polarized state of the light is further changed by the birefringence actions of these components and is incident on the polarizing plate 30.

The reflected light incident on the polarizing plate 30 has undergone changes in polarized state owing to the birefringence actions of the retardation plate 40 and the liquid crystal layer to become nonlinearly polarized light. Of this light, therefore, only a light component having a wavelength allowed by the polarizing plate 30 is transmitted therethrough to emerge. This exit light component becomes colored light corresponding to the wavelength.

That is, this liquid crystal display device is designed to color light by using the birefringence actions of the retardation plate 40 and the liquid crystal cell 10 and the polarizing and analyzing actions of the polarizing plate 30. According to this liquid crystal display device, very bright colored light can be obtained as compared with a general liquid crystal display device using a color filter.

A color filter absorbs light components having wavelengths outside a wavelength range corresponding to the color of the filter to color light. This color filter absorbs light components in the wavelength range corresponding to the color of the filter at a considerably high absorption index. For this reason, in a liquid crystal display device designed to color light by using a color filter, the amount of colored light having passed through the color filter is considerably smaller than the amount of light components, of light incident on the display device, which are in the wavelength range corresponding to the color of the filter.

In contrast to this, in the liquid crystal display device of the above embodiment, since transmitted light is colored without using any color filters, no light absorption in a color filter occurs. In addition, since the retardation plate 40 and the liquid crystal layer change only the polarized state of transmitted light, a large amount of colored light is transmitted through the polarizing plate 30 and emerges from the device after having undergone changes in polarized state owing the birefringence actions of these components. That is, light components, of linearly polarized light incident through the polarizing plate 30, which are in the wavelength range in which light components are to be colored are rarely absorbed, and hence high-luminance colored light can be obtained.

Furthermore, in a liquid crystal display device using a color filter, since the display color is determined by the color of the filter, a plurality of colors cannot be displayed by one pixel. However, according to the liquid crystal display device of the above embodiment, a plurality of colors can be displayed by one pixel.

More specifically, in the liquid crystal display device of the above embodiment, although the birefringence action of the retardation plate 40 does not change, the birefringence action of the liquid crystal layer of the liquid crystal cell 10 changes as the aligned state of the liquid crystal molecules changes in accordance with the magnitude of a voltage applied between the pixel electrodes 13 and the counter electrode 24.

When a voltage for aligning the liquid crystal molecules almost vertically with respect to the surfaces of the substrates 11 and 12 is applied between the electrodes 13 and 24 of the liquid crystal cell 10, the birefringence action of the liquid crystal layer is lost apparently. Even in this case, the polarized state of light incident through the polarizing plate 30 can be changed by the birefringence action of the retardation plate 40.

For this reason, when the birefringence action of the liquid crystal layer is changed by controlling a voltage applied to the liquid crystal cell 10, the polarized state of light passing through the retardation plate 40 and the liquid crystal layer of the liquid crystal cell 10 is changed accordingly. Therefore, the color of colored light transmitted through the polarizing plate 30 and emerging from the device can be changed. That is, a plurality of colors can be displayed by one pixel.

The display operation of this liquid crystal display device is basically the same as that of a known active matrix liquid crystal display device (using TFTs as active elements). First of all, a reference signal having a waveform synchronized with a sync signal is supplied to the counter electrode 24 of the liquid crystal cell 10. Gate signals are then sequentially supplied to the respective gate lines in synchronism with the sync signal. At the same time, a data signal having a potential corresponding to image data is supplied to each data line in synchronism with the above operation. By controlling the potential of the data signal in accordance with the image data, the data signal having the potential corresponding to the image data is supplied to the pixel electrode 13 via the TFT 14 during a selection period of each pixel on each row. The corresponding charge is stored in the compensation capacitor Cs, and a voltage corresponding to the amount of charge stored in this compensation capacitor Cs is applied between the pixel electrode 13 and the counter electrode 24 during a non-selection period.

The display colors of the above liquid crystal display device will be described. Assume, as described above, that the liquid crystal molecules of the liquid crystal cell 10 are twisted/aligned between the two substrates 11 and 12 at a twist angle of almost 90°, and the liquid crystal molecule aligning directions 11a and 12a on the two substrates 11 and 12, the transmission axis 30a of the polarizing plate 30, and the phase delay axis 40a of the retardation plate 40 are respectively set in the directions shown in FIGS. 3A to 3C, while a value $\Delta$ n.d (the product of a refractive index anisotropy $\Delta n$ and a liquid crystal layer thickness d of the liquid crystal 26) of the liquid crystal cell 10 is about 1,000 nm; and the retardation value of the retardation plate 40, about 600 nm. In this case, red, green, blue, and white can be displayed by one pixel.

Figure 4:
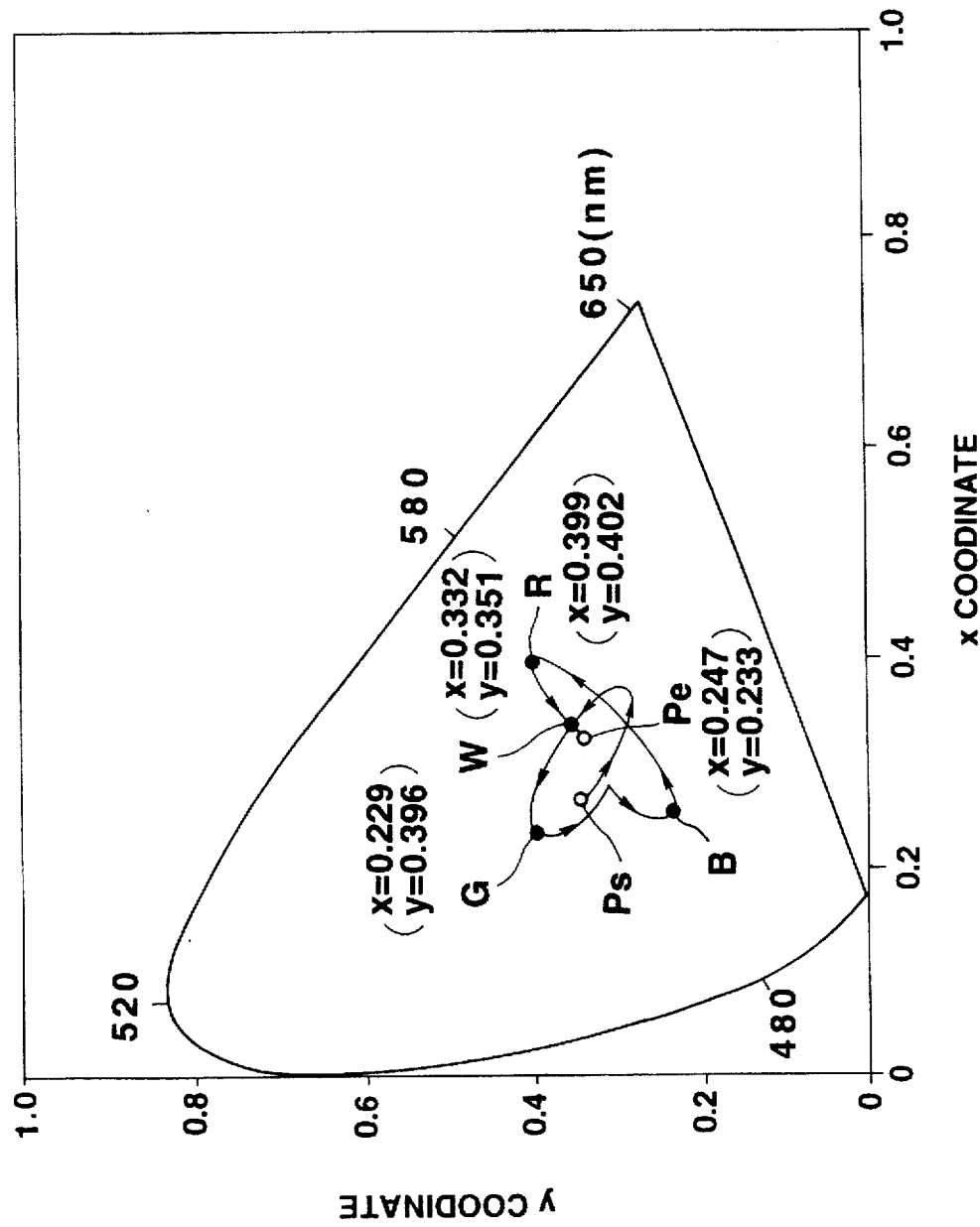
FIG. 4 is a graph showing a CIE chromaticity diagram indicating a change in display color with a change in the voltage applied to the liquid crystal display device shown in FIG. 1.

FIG. 4 shows a CIE chromaticity diagram indicating a change in the color of exit light with a change in the voltage applied to the liquid crystal display device. More specifically, FIG. 4 shows a result obtained by causing white light to be incident, on the liquid crystal display device, from a direction at 30° (an arbitrary azimuth) with respect to the normal of the device, and observing exit light from the direction of the normal of the liquid crystal display device.

As shown in FIG. 4, in the above liquid crystal display device, as the voltage applied between the electrodes 13 and 24 of the liquid crystal cell 10 is raised, the color of exit light changes from a point Ps to a point Pe, as indicated by the arrows. In this process, the exit light becomes green G, blue B, red R, and white W, each having a high light intensity and a high chromaticity purity.

These colors G, B, R, and W have the following x-and y-coordinate values: x=0.229 and y=0.396 for green G; x=0.247 and y=0.233 for blue B; x=0.399 and y=0.402 for red R; and x=0.332 and y=0.351 for white W, each exhibiting a sufficiently high chromatic purity.

In the above liquid crystal display apparatus, as shown in FIG. 4, even in the process of a change in the color of exit light from green G to blue B, the color of the exit light approaches white W. However, in this case, a change in color with a change in voltage is large. For this reason, cumbersome voltage control is required to display this color. Therefore, white W is preferably displayed by using a voltage higher than a voltage for obtaining a display color of red R.

As described above, according to the above liquid crystal display device, since the color of exit light becomes green G, blue B, red R, or white W in accordance with the applied voltage, red, green, blue, and white can be displayed by one pixel. In addition, a color mixture of a plurality of colors of the above red, green, blue, and white can be displayed by causing a plurality of adjacent pixels to display different colors.

The liquid crystal display device of the above embodiment is designed to display red, green, blue, and white.

However, since the display colors of the liquid crystal display device are determined by the applied voltages, the liquid crystal molecule aligning directions 11a and 12a on the two substrates 11 and 12 of the liquid crystal cell 10, the twist angle of the liquid crystal molecules, the direction of the transmission axis 30a of the polarizing plate 30, and the direction of the phase delay axis 40a of the retardation plate 40, arbitrary colors can be selected as the display colors of the liquid crystal display device by properly setting these conditions.

Although the above liquid crystal display device is of a reflection type, the light amount loss due to light absorption in the substrates of the liquid crystal cell 10 and the polarizing plate 30 can be reduced, and the device can provide a brighter display because the reflecting film 22 is formed on the inner surface of the rear substrate 11 of the liquid crystal cell 10 to reflect light, the light passes through only the front substrate 12 of the two substrates of the liquid crystal cell 10, and only one polarizing plate 30 is used.

In this liquid crystal display device, although light passes through both the retardation plate 40 and the liquid crystal layer of the liquid crystal cell 10, since light is rarely absorbed by the retardation plate 40 and the liquid crystal layer as described above, almost no light amount loss occurs.

In addition, in this liquid crystal display device, the reflecting film 22 is formed, via the transparent gate insulating film 16, on the rear side of each pixel electrode 13 arranged on the inner surface of the rear substrate 11 of the liquid crystal cell 10, and the compensation capacitor Cs for each pixel is constituted by the reflecting film 22, the pixel electrode 13, and the gate insulating film 16 formed therebetween. In addition, the reflecting film 22 is formed in a size corresponding to almost the entire surface of each pixel electrode 13. Therefore, the opening ratio can be increased, and a sufficient capacitance can be ensured for the compensation capacitor Cs.

In addition, in this liquid crystal display device, the above reflecting film 22 also serves as the capacitor electrode of the compensation capacitor Cs, and the reflecting film 22 is formed by using the same metal film as the gate electrode 15 and the gate line of the TFT 14. For this reason, the liquid crystal cell 10 can be manufactured at a low cost, although the reflecting film 22 is formed on the inner surface of the rear substrate 11 of the liquid crystal cell 10, and the compensation capacitor Cs for each pixel is formed. Therefore, an inexpensive liquid crystal display device can be provided.

In the above liquid crystal display device, although the reflecting film 22 is formed on the inner surface of the rear substrate 11 of the liquid crystal cell 10, since the front surface of the polarizing plate 30 serves as the light-scattering surface A, light which is incident on and emerges from the liquid crystal display device can be scattered by the light-scattering surface A. Even if, therefore, the reflecting surface of the reflecting film 22 is a mirror surface, reflection of an external image such as the face of a display observer or its background in the reflecting surface can be prevented.

More specifically, the above liquid crystal display device is designed to color light without using any color filters, and hence a high transmittance can be ensured. For this reason, if the reflecting surface of the reflecting film 22 is a mirror surface, and the polarizing plate 30 does not have a light-scattering function, an external image such as the face of a display observer or its background is reflected in the reflecting surface. As a result, the image overlaps a display image. If, however, the polarizing plate 30 has a light-scattering function, the reflection of the above external image does not occur.

Furthermore, in the above liquid crystal display device, since the reflecting surface of the reflecting film 22 formed on the rear substrate 11 of the liquid crystal cell 10 is a mirror surface, light whose polarized state is changed by the birefringence action of the liquid crystal layer can be reflected to be incident on the polarizing plate 30 without being scattered. Since the front surface of the polarizing plate 30 is the light-scattering surface A, light which is incident on the liquid crystal display device from its front surface side is scattered and linearly polarized by the polarizing action of the polarizing plate 30. In addition, light reflected by the reflecting film 22 is scattered after it is formed into image light by the analyzing action of the polarizing plate 30. For this reason, the light which is incident through the polarizing plate 30 is not scattered until it is incident on the polarizing plate 30 again. Therefore, a high-quality image can be displayed.

The scattering effect of the light-scattering surface A is determined by the above haze value. If this haze value is 25% or more, light formed into image light by the analyzing action of the polarizing plate 30 is scattered greatly, resulting in an unclear display image. If the haze value is 6% or less, reflection of the above external image occurs. If the haze value of the light-scattering surface A falls within the range of 9 to 14%, a clear display image can be obtained, and reflection of an external image can be prevented.

In the liquid crystal display device of the above embodiment, the retardation plate 40 is arranged between the liquid crystal cell 10 and the polarizing plate 30. However, this retardation plate 40 may be omitted. In this case as well, if the transmission axis of the polarizing plate 30 is obliquely shifted from the liquid crystal molecule aligning direction on the rear substrate 11, the polarized state of light which is incident through the polarizing plate 30 is changed by the birefringence action of the liquid crystal layer of the liquid crystal cell 10 in the process of the passage of the light through the liquid crystal layer. The light is then reflected by the inner surface of the front substrate 12 of the liquid crystal cell 10, and the polarized state of the light is further changed in the process of the passage of the light through the liquid crystal layer. The light is then incident on the polarizing plate 30. Therefore, polarized light components transmitted through the polarizing plate 30 can be caused to emerge as colored light. In addition, the color of the colored light can be changed by controlling the voltage applied to the liquid crystal cell 10.

As in the above embodiment, however, if the retardation plate 40 is arranged between the liquid crystal cell 10 and the polarizing plate 30, the polarized state of light which is incident through the polarizing plate 30 can be changed by the birefringence action of the retardation plate 40 while the light passes through the liquid crystal layer of the liquid crystal cell 10 and is incident on the polarizing plate 30. For this reason, even when a voltage is applied to the liquid crystal cell 10 to align the liquid crystal molecules almost vertically with respect to the surfaces of the substrates 11 and 12, i.e., the birefringence action of the liquid crystal layer is almost lost apparently, colored light can be obtained such that light whose polarized state is changed by the birefringence action of the retardation plate 40 is caused to be incident on the polarizing plate 30. In this case, two or more retardation plates may be stacked on each other.

In the above embodiment, the twist angle of the liquid crystal molecules of the liquid crystal cell 10 is set to be almost 90°. However, the twist angle of the liquid crystal molecules is not limited to 90°, and may be set to be, e.g., 180° to 270°.

In addition, in the above embodiment, as the liquid crystal cell 10, an active matrix cell using the TFTs 14 as active elements is used. However, as this liquid crystal cell, an active matrix cell using two-terminal nonlinear resistive elements such as MIMs or thin-film diodes as active elements may be used. Furthermore, the liquid crystal cell 10 may be set in an aligned state based on homogeneous alignment, homeotropic alignment, or hybrid alignment.

[Second Embodiment]

Figure 5:
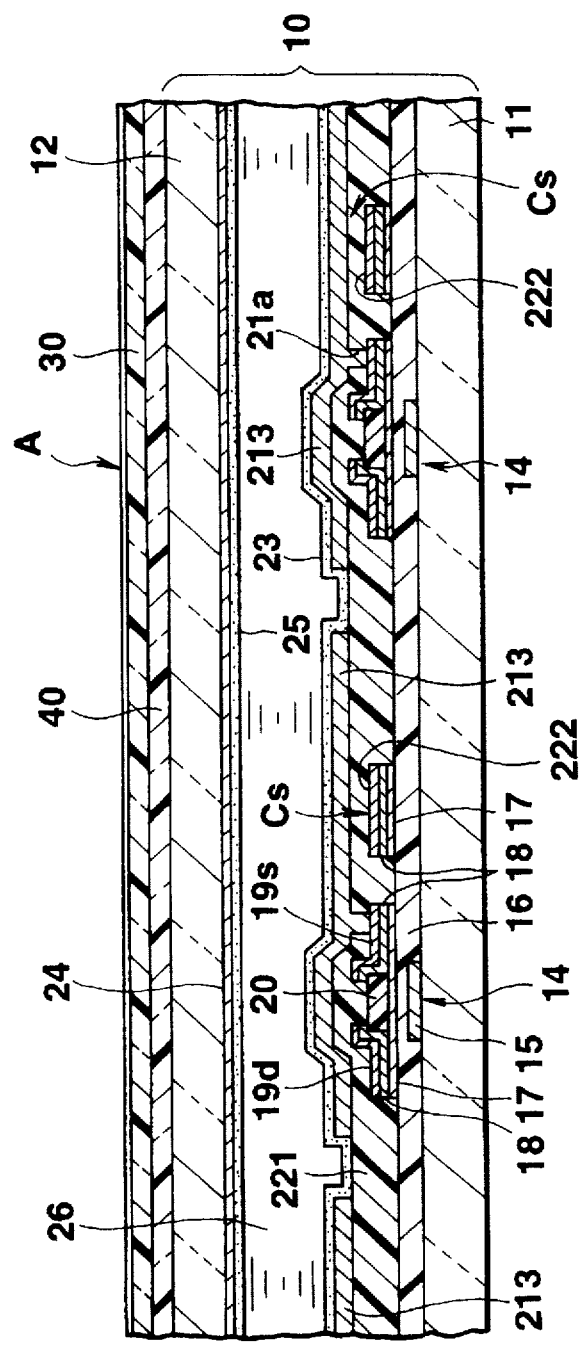
FIG. 5 is a sectional view showing part of a liquid crystal display device according to the second embodiment of the present invention.

FIG. 5 is a sectional view showing part of a liquid crystal display device according to the second embodiment of the present invention. In this liquid crystal display device, a pixel electrode is extended to cover each thin-film transistor, and a compensation capacitor Cs is constituted by electrodes opposing each other through the protective insulating film of the thin-film transistor. The second embodiment is different from the first embodiment in the connecting structure between each thin-film transistor formed on the rear substrate 11 of the liquid crystal cell 10 and the corresponding pixel electrode 13, and the structure of the compensation capacitor Cs. Since the remaining structures of the second embodiment are the same as those of the first embodiment, the same reference numerals in the second embodiment denote the same parts as in the first embodiment, and a description thereof will be omitted.

Figure 6:
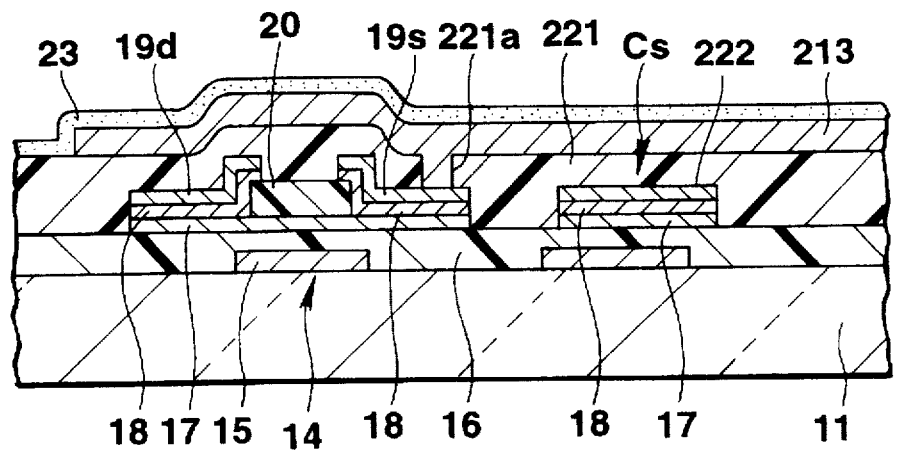
FIG. 6 is an enlarged sectional view showing a TFT portion in the liquid crystal display device in FIG. 5.

As shown in FIGS. 5 and 6, in the liquid crystal display device of the second embodiment, each TFT 14 formed on the rear substrate 11 is covered with a protective insulating film 221.

Pixel electrodes 213 are formed on the protective insulating film 221 to cover the TFTs 14. Each pixel electrode 213 is connected to a source electrode 19s of the corresponding TFT 14 via a contact hole 221a formed in the protective insulating film 221.

This pixel electrode 213 consists of a metal film for reflecting light, e.g., an Al alloy having a high reflectance. That is, the pixel electrode 213 also serves as a reflecting film, with its front surface (reflecting surface) being formed into an almost mirror surface.

On the gate insulating film 16, a capacitor electrode 222 is formed to oppose each pixel electrode 213 through the protective insulating film 221. The compensation capacitor Cs for compensating the voltage held in the pixel during a non-selection period is constituted by the capacitor electrode 222, the pixel electrode 213, and the insulating film 221 formed therebetween.

Although not shown, a capacitor line integrally formed with the capacitor electrode 222 is arranged on the gate insulating film 16. Each capacitor electrode 222 is connected to a reference voltage via the above capacitor line.

The capacitor electrode 222 and the capacitor line consist of the same metal film as the source electrode 19s and a drain electrode 19d of the TFT 14. The capacitor electrode 222 and the source and drain electrodes 19s and 19d are simultaneously formed by forming a metal film consisting of Cr or the like using a sputtering apparatus or the like and patterning the film by a photolithographic method.

In this embodiment, the TFT 14 is formed by the following method. After a gate electrode 15 is formed on a substrate 11, a gate insulating film 16, an i-type semiconductor film 17, and a blocking insulating film 20 are sequentially formed, and the blocking insulating film 20 is patterned. Thereafter, an n-type semiconductor film 18 and a metal film for source and drain electrodes are sequentially formed. The metal film, the n-type semiconductor film 18, and i-type semiconductor film 17 are patterned into the outer shape of the TFT 14. Subsequently, the metal film and the n-type semiconductor film 18 are patterned into the shapes of the source and drain electrodes 19s and 19d. Therefore, the i-type semiconductor film 17 and the n-type semiconductor film 18 are also left under the capacitor electrode 222.

In the liquid crystal display device of the second embodiment, similar to the first embodiment described above, one pixel can display red, green, blue, and white in accordance with different applied voltages.

In the above liquid crystal display device, the pixel electrode 213 formed on the inner surface of the rear substrate 11 of a liquid crystal cell 10 also serves as a reflecting film so that light can be reflected by the pixel electrode 213 on the inner surface of the rear substrate 11 of the liquid crystal cell 10. Therefore, light passes through only the front substrate 12 of the two substrates 11 and 12 of the liquid crystal cell 10. In addition, since only one polarizing plate 30 is used, the light amount loss due to light absorption in the substrates of the liquid crystal cell and the polarizing plate can be reduced.

In addition, in the liquid crystal display device, the TFTs 14 arranged on the inner surface of the rear substrate 11 of the liquid crystal cell 10 are covered with the protective insulating films 221, and the pixel electrodes 213 also serving as reflecting films are formed on the protective insulating films 221 to cover the TFTs 14. With this arrangement, the area of each pixel electrode 213 can be increased to increase the opening ratio.

According to the above liquid crystal display device, therefore, the light amount loss due to light absorption in the substrates of the liquid crystal cell and the polarizing plate can be reduced, and the opening ratio can be increased to provide a bright display, although the device is of a reflection type.

Furthermore, in the above liquid crystal display device, since light is reflected by each pixel electrode 213, the opening ratio is not influenced by the capacitor electrode 222 formed on the rear surface side of the pixel electrode 213. Therefore, the area of the capacitor electrode 222 can be arbitrarily set. In addition, since the capacitor electrode 222 is formed on the gate insulating film 16 of each TFT 14, and the compensation capacitor Cs is constituted by the capacitor electrode 222, the pixel electrode 213, and the protective insulating film 221 formed therebetween, a sufficient capacitance can be ensured for the compensation capacitor Cs by reducing the thickness of the insulating film of the compensation capacitor Cs.

More specifically, the capacitance of a capacitor constituted by a pair of electrodes opposing each other through an insulating film is determined by the thickness of the insulating film and the area of the portion where the pair of electrodes oppose each other. If the area of the portion where the electrodes oppose each other remains the same, the capacitance increases with a decrease in thickness of the insulating film.

In a conventional device, a capacitor electrode is formed (on a substrate) by using the same metal film as the gate electrode of a TFT, and a compensation capacitor is constituted by this capacitor electrode, the gate insulating film of the TFT, and a pixel electrode. In the above case wherein the pixel electrode 213 is formed on the protective insulating film 221 formed on the gate insulating film 16, if the capacitor electrode 222 is formed on the substrate 11 by using the same metal film as the gate electrode 15 of the TFT 14, a two-layer insulating film constituted by the gate insulating film 16 and the protective insulating film 221 is formed between the capacitor electrode 222 and the pixel electrode 213. As a result, the insulating film of the compensation capacitor Cs increases in thickness, and the capacitance decreases.

In the above embodiment, therefore, the capacitor electrode 222 is formed on the gate insulating film 16, and the compensation capacitor Cs is constituted by the capacitor electrode 222, the pixel electrode 213, and the protective insulating film 221 formed therebetween. With this arrangement, since the thickness of the insulating film of the compensation capacitor Cs corresponds to only the thickness of the protective insulating film 221. That is, the thickness of the insulating film of the compensation capacitor Cs can be decreased, and a sufficient capacitance can be ensured.

As described above, the area of the capacitor electrode 222 can be arbitrarily set. For this reason, if the capacitor electrode 222 is increased in size, the capacitance of the compensation capacitor Cs can be further increased. However, an increase in size of the reflecting film 22 increases the rate of occurrence of interlayer short circuit between the capacitor electrode 222 and the pixel electrode 213 which is caused by pinhole defects and the like in the protective insulating film 221. Therefore, the area of the capacitor electrode 222 is preferably minimized within a range in which a desired capacitance can be obtained.

In the above embodiment, since the capacitor electrode 222 is formed by using the same metal film as the source and drain electrodes 19s and 19d of the TFT 14, the capacitor electrode 222 can be formed by using the process of forming the TFT 14. Therefore, the liquid crystal cell 10 can be manufactured at a low cost. In addition, since each pixel electrode 213 of the liquid crystal cell 10 also serves as a reflecting film, any other reflecting plate is not required. This allows a reduction in the cost of the liquid crystal display device.

Furthermore, since the pixel electrode 213 is a very thin metal film, the front surface, i.e., the reflecting surface, of the pixel electrode 213 is an almost mirror surface. In the above embodiment, however, since the front surface of the polarizing plate 30 serves as a light-scattering surface A, light which is incident on and emerges from the liquid crystal display device can be scattered on the light-scattering surface A. Even if, therefore, the reflecting surface of the pixel electrode 213 is a mirror surface, an external image such as the face of a display observer or its background is not reflected in the reflecting surface.

In the above embodiment, the i-type semiconductor film 17 and the n-type semiconductor films 18 constituting the TFT 14 are left under the capacitor electrode 222. However, only the n-type semiconductor films 18 are left under the capacitor electrode 222 according to the following method of forming the TFT 14. The n-type semiconductor films 18 and a metal film for source and drain electrodes are formed after the i-type semiconductor film 17 is patterned. This metal film and the n-type semiconductor films 18 are then patterned into the shapes of the source and drain electrodes 19s and 19d. In addition, the capacitor electrode 222 may be formed by using a metal film different from the source and drain electrodes 19s and 19d of the TFT 14.

[Third Embodiment]

Figure 7:
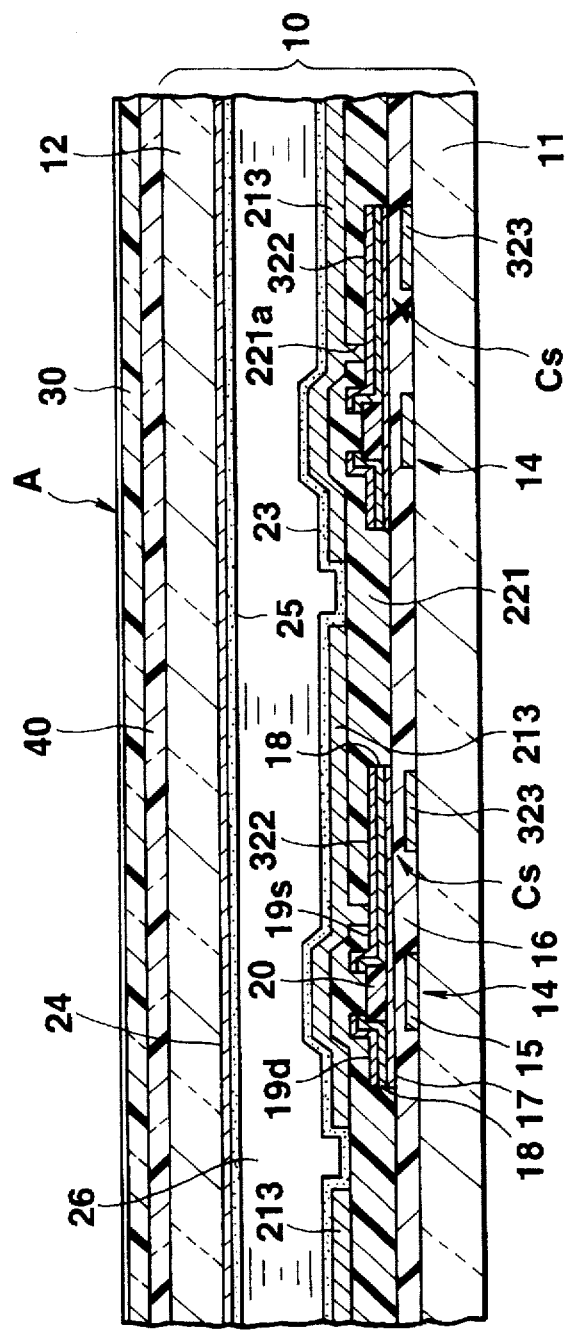
FIG. 7 is a sectional view showing part of a liquid crystal display device according to the third embodiment of the present invention.

FIG. 7 is a sectional view showing part of a liquid crystal display device according to the third embodiment of the present invention. In this liquid crystal display device, a pixel electrode is also formed on each thin-film transistor, and a compensation capacitor Cs is constituted by electrodes opposing each other through a gate insulating film. The third embodiment is different from the second embodiment in the structure of the source electrode of each thin-film transistor formed on the rear substrate 11 of the liquid crystal cell 10, and the structure of the compensation capacitor Cs. Since the remaining structures of the third embodiment are the same as those of the second embodiment, the same reference numerals in the third embodiment denote the same parts as in the second embodiment, and a description thereof will be omitted.

Figure 8:
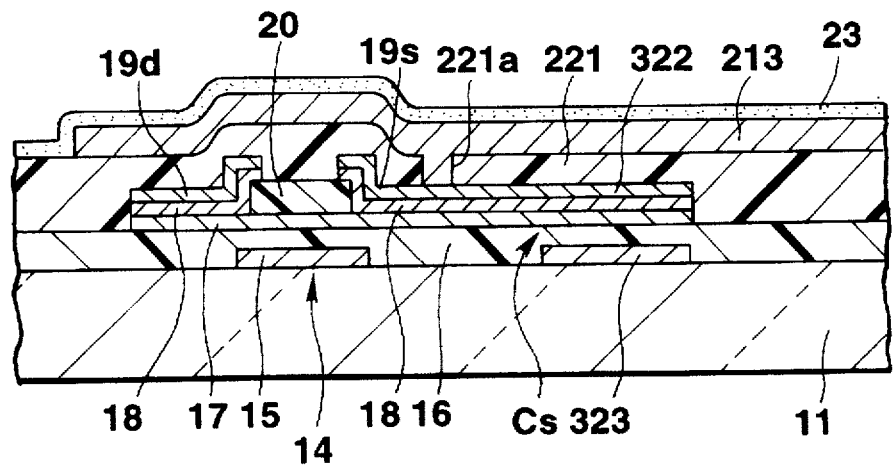
FIG. 8 is an enlarged sectional view showing a TFT portion in the liquid crystal display device in FIG. 7.

As shown in FIGS. 7 and 8, in the liquid crystal display device of the third embodiment, each TFT 14 formed on the rear substrate 11 is covered with a protective insulating film 221.

Pixel electrodes 213 are formed on the protective insulating films 221 to cover the TFTs 14. Each pixel electrode 213 is connected to a source electrode 19s of the corresponding TFT 14 via a contact hole 221a formed in the protective insulating film 221.

This pixel electrode 213 consists of a metal film for reflecting light, e.g., an Al alloy having a high reflectance. That is, the pixel electrode 213 also serves as a reflecting film, with its front surface (reflecting surface) being formed into an almost mirror surface.

A first capacitor electrode 322 is formed on a gate insulating film 16 at a position below a portion of the pixel electrode 213 so as to be electrically connected to the source electrode 19s of the TFT 14. A second capacitor electrode 323 is formed on the rear substrate 11 to oppose the first capacitor electrode 322 through the gate insulating film 16. The compensation capacitor Cs for compensating for the voltage held in the pixel during a non-selection period is constituted by these capacitor electrodes 322 and 323 and the gate insulating film 16 formed therebetween.

The first capacitor electrode 322 is formed by using the same metal film as the source electrode 19s and a drain electrode 19d of the TFT 14. The first capacitor electrode 322 is integrally formed with the source electrode 19s.

The second capacitor electrode 323 is formed by using the same metal film as a gate electrode 15 of the TFT 14. The second capacitor electrode 323, the gate electrode 15, and a gate line are simultaneously formed by forming a metal film on the substrate 11 and patterning the film by a photolithographic method.

Although not shown, a capacitor line integrally formed with the second capacitor electrode 323 is arranged on the rear substrate 11. The second capacitor electrode 323 is connected to a reference potential via the capacitor line.

In the liquid crystal display device of the third embodiment as well, one pixel can display red, green, blue, and white in accordance with different applied voltages, as in the first embodiment.

In the above liquid crystal display device, the TFTs 14 arranged on the inner surface of the rear substrate 11 of the liquid crystal cell 10 are covered with the protective insulating films 221, and the pixel electrodes 213 also serving as reflecting films are formed on the protective insulating films 221 to cover the TFTs 14. Therefore, the opening ratio can be increased by increasing the area of each pixel electrode 213.

According to the above liquid crystal display device, therefore, the light amount loss due to light absorption in the substrates of the liquid crystal cell and the polarizing plate can be reduced, and the opening ratio can be increased to provide a bright display, although the device is of a reflection type.

Furthermore, in the above liquid crystal display device, since light is reflected by each pixel electrode 213, the opening ratio is not influenced by the capacitor electrodes 322 and 323 formed on the rear surface side of the pixel electrode 213. Therefore, the areas of the capacitor electrodes 322 and 323 can be arbitrarily set. In addition, the first capacitor electrode 322 electrically connected to the source electrode 19s of the TFT 14 is formed on the gate insulating film 16, and the second capacitor electrode 323 is formed on the rear substrate 11 to oppose the first capacitor electrode 322 through the gate insulating film 16. The compensation capacitor Cs is constituted by these capacitor electrodes 322 and 323 and the gate insulating film 16 formed therebetween. Therefore, a sufficient capacitance can be ensured for the compensation capacitor Cs by reducing the thickness of the insulating film of the compensation capacitor Cs.

In the above embodiment, the first capacitor electrode 322 electrically connected to the source electrode 19s is formed on the gate insulating film 16, and the second capacitor electrode 323 is formed on the rear substrate 11. The compensation capacitor Cs is constituted by these capacitor electrodes 322 and 323 and the gate insulating film 16 formed therebetween. With this arrangement, since the thickness of the insulating film of the compensation capacitor Cs corresponds to only the thickness of the gate insulating film 16. That is, the thickness of the insulating film of the compensation capacitor Cs can be decreased, and a sufficient capacitance can be ensured.

Furthermore, in the above embodiment, the first capacitor electrode 322 is formed integrally with the source electrode 19s of the TFT 14, and the second capacitor electrode 323 is formed by using the same metal film as the gate electrode 15 of the TFT 14. For this reason, the compensation capacitor Cs can be formed by using the process of forming the TFT 14. Therefore, the liquid crystal cell 10 can be manufactured at a low cost. In addition, since the pixel electrode 213 of the liquid crystal cell 10 also serves as a reflecting film, any other reflecting plate is not required. This allows a reduction in the cost of the liquid crystal display device.

In the above embodiment, an i-type semiconductor film 17 and n-type semiconductor films 18 constituting the TFT 14 are left under the first capacitor electrode 322. However, only the n-type semiconductor films 18 are left under the first capacitor electrode 322 according to the following method of forming the TFT 14. The n-type semiconductor films 18 and a metal film for source and drain electrodes are formed after the i-type semiconductor film 17 is patterned. This metal film and the n-type semiconductor films 18 are then patterned into the shapes of the source and drain electrodes 19s and 19d. In addition, the first capacitor electrode 322 may be formed by using a metal film different from the source and drain electrodes 19s and 19d of the TFT 14.

[Fourth Embodiment]

Figure 9:
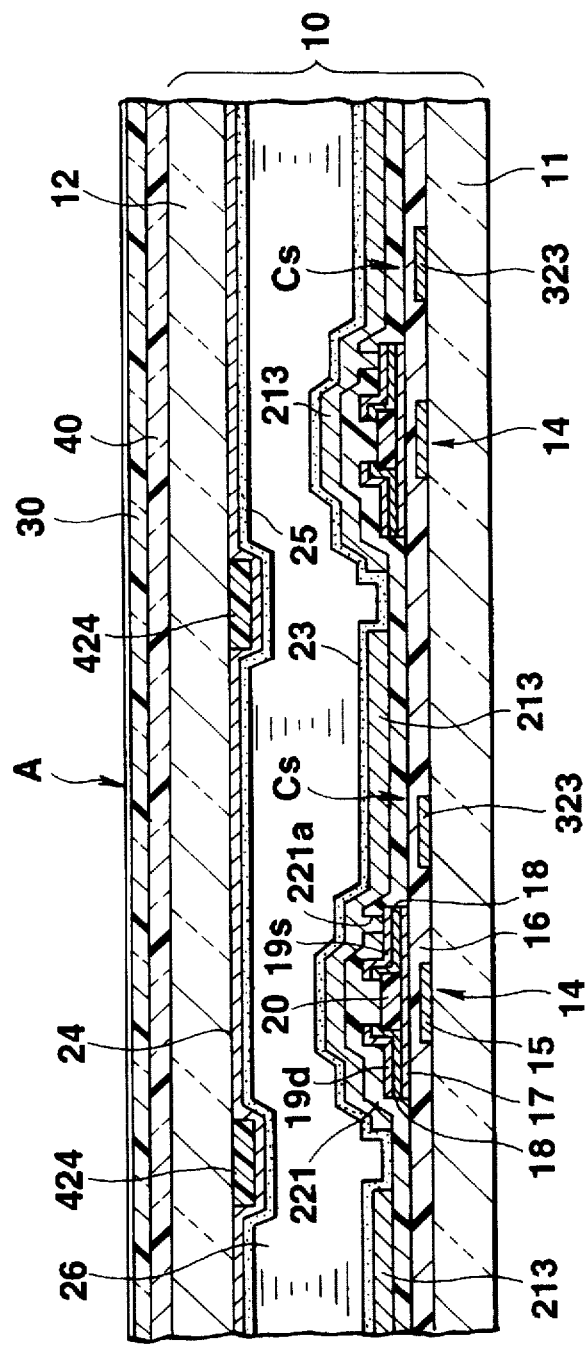
FIG. 9 is a sectional view showing part of a liquid crystal display device according to the fourth embodiment of the present invention.

FIG. 9 is a sectional view showing part of a liquid crystal display device according to the fourth embodiment of the present invention. In this liquid crystal display device, a pixel electrode is also formed on each thin-film transistor via a protective insulating film, and a compensation capacitor Cs is constituted by a gate insulating film and electrodes opposing each other through the protective insulating film. In addition, light-shielding members are formed on the inner surface of the front substrate to prevent leakage of light between pixel electrodes. The fourth embodiment is different from the third embodiment in the structure of electrodes constituting the compensation capacitor Cs and the structure of each light-shielding film formed on the front substrate 12. Since the remaining structures of the fourth embodiment are the same as those of the second embodiment, the same reference numerals in the fourth embodiment denote the same parts as in the second embodiment, and a description thereof will be omitted.

As shown in FIG. 9, in the liquid crystal display device of the fourth embodiment, a capacitor electrode 323 is formed on a rear substrate 11 to oppose each pixel electrode 213 through a gate insulating film 16 and a protective insulating film 221, and the compensation capacitor (storage capacitor) Cs for compensating for the voltage held in the pixel during a non-selection period is constituted by the capacitor electrode 323, the pixel electrode 213, and the insulating films 16 and 221 formed therebetween. Although not shown, a capacitor line integrally formed with each capacitor electrode 323 is arranged on the rear substrate 11. Each capacitor electrode 323 is connected to a reference potential via the corresponding capacitor line.

The front substrate (upper substrate in FIG. 9) 12 of a liquid crystal cell 10 is a transparent substrate constituted by a glass plate, a transparent resin film, or the like (a glass plate in FIG. 9). Black masks 424 are formed on the inner surface, i.e., the surface opposing the liquid crystal layer, of the front substrate 12 to correspond to the gaps between the respective pixel electrodes 213 arranged on the rear substrate 11. A transparent counter electrode 24 is formed on the black masks 424 to oppose all the pixel electrodes 213 on the rear substrate 11. A transparent aligning film 25 is formed on the counter electrode 24.

Each black mask 424 described above is made of a black resin or a metal film consisting of Cr or the like (a black resin in FIG. 9). These black masks 424 are formed into a matrix pattern to correspond to the gaps between the respective pixel electrodes arranged in the row and column directions in the form of a matrix. This black mask 424 is formed to have such a width that its edge portion opposes an edge portion of the pixel electrode 213 with a small overlapping width.

In the liquid crystal display device of the fourth embodiment as well, one pixel can display red, green, blue, and white in accordance with different applied voltages, as in the first embodiment.

Furthermore, in the above liquid crystal display device, since light is reflected by each pixel electrode 213, the opening ratio is not influenced by the capacitor electrode 323 formed on the rear surface side of the pixel electrode 213. For this reason, the area of the capacitor electrode 323 can be arbitrarily set, and hence a sufficient capacitance can be ensured for the compensation capacitor Cs.

[Fifth Embodiment]

In the fourth embodiment described above, the black masks 424 are formed on the inner surface of the front substrate 12 of the liquid crystal cell 10. However, these black masks may be formed on the inner surface of the rear substrate 11 on which the pixel electrodes 213 and the TFTs 14 are arranged.

Figure 10:
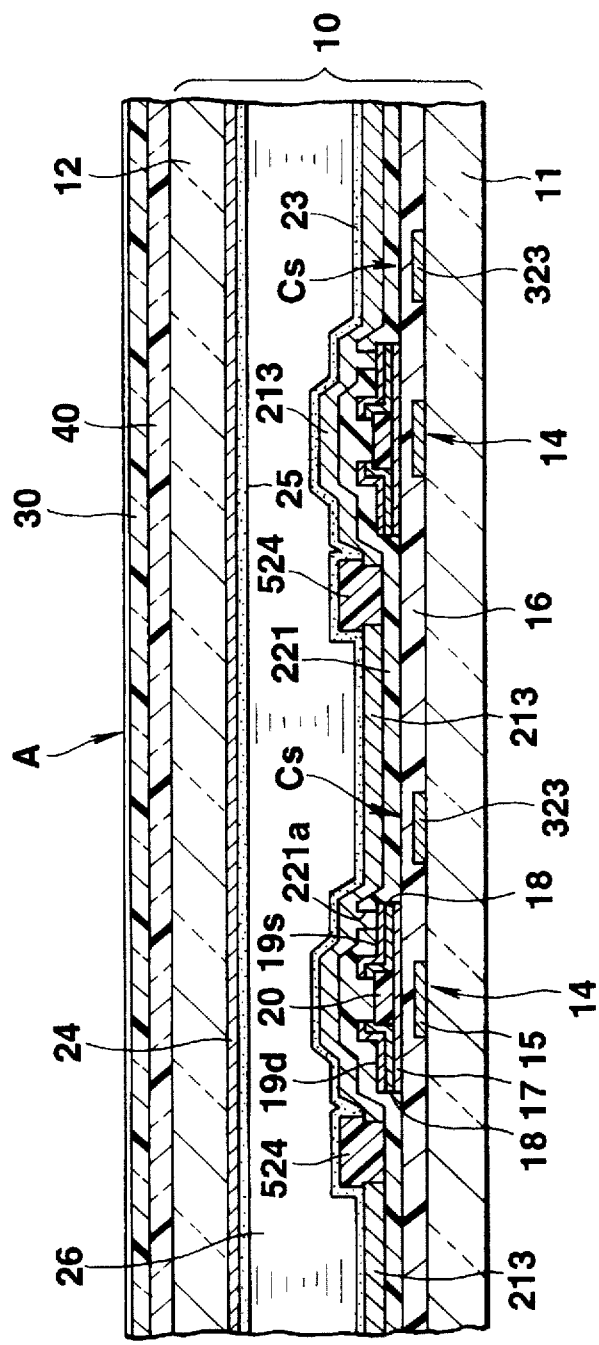
FIG. 10 is a sectional view showing part of a liquid crystal display device according to the fifth embodiment of the present invention.

FIG. 10 is a sectional view showing part of an active matrix liquid crystal display device according to the fifth embodiment of the present invention.

In the active matrix liquid crystal display device of this embodiment, insulating black masks 524 consisting of a black resin are formed on the inner surface of a rear substrate 11 of a liquid crystal cell 10 in the form of a matrix pattern. Each black mask 524 is formed on a protective insulating film 221 as an underlying film of a pixel electrode 213 in such a manner that an edge portion of the black mask 524 overlaps an edge portion of the pixel electrode 213 with a very small overlapping width.

In the liquid crystal display device of this embodiment, the black masks 524 are formed on the inner surface of the rear substrate 11 of the liquid crystal cell 10. Other arrangements are the same as those of the liquid crystal display device of the fourth embodiment. Therefore, the same reference numerals in FIG. 10 denote the same parts as in FIG. 9, and a repetitive description will be avoided.

As in this embodiment, if the black masks 524 are arranged on the inner surface of the rear substrate 11 on which the pixel electrodes 213 and the TFTs 14 are arranged, since the black masks 524 can be formed in correspondence with the gaps between the respective pixel electrodes 213, each black mask 524 can be further reduced in width, and the opening ratio can be further increased.

[Sixth Embodiment]

In each of the fourth and fifth embodiments described above, the pixel electrodes and the thin-film transistors are arranged on the substrate on which the reflecting member is formed. However, the present invention is not limited to this. For example, pixel electrodes, thin-film transistors, and light-shielding films may be formed on the front substrate on which light is incident.

Figure 11:
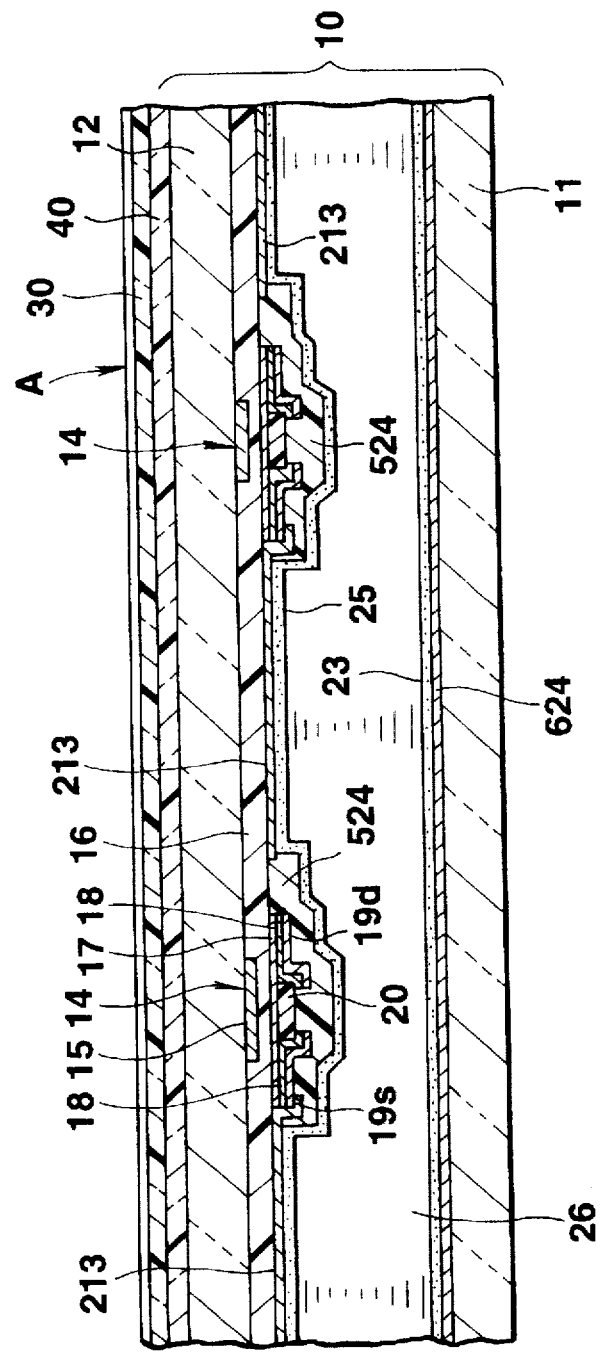
FIG. 11 is a sectional view showing part of a liquid crystal display device according to the sixth embodiment of the present invention.

FIG. 11 is a sectional view showing part of a liquid crystal display device according to the sixth embodiment of the present invention. In this liquid crystal display device, pixel electrodes, thin-film transistors, and light-shielding films are formed on the front substrate on which light is incident. The sixth embodiment is different from the fifth embodiment in that thin-film transistors are formed on a front substrate 12. Other arrangements are the same as those of the fifth embodiment. Therefore, the same reference numerals in the sixth embodiment denote the same parts as in the fifth embodiment, and a description thereof will be omitted.

In the liquid crystal display device of the sixth embodiment, as shown in FIG. 11, TFTs 14 are formed on the front substrate 12. More specifically, the front substrate 12 of a pair of substrates 11 and 12 opposing each other through the liquid crystal layer of a liquid crystal cell 10 is a transparent substrate constituted by a glass plate, a transparent resin film, or the like. A plurality of transparent pixel electrodes 213 and a plurality of TFTs 14 corresponding to the respective pixel electrodes 213 are arranged on the inner surface, i.e., the surface opposing the liquid crystal layer, of the front substrate 12 in the row and column directions in the form of a matrix. In addition, black masks 524 are formed on the inner surface of the front substrate 12 in correspondence with the gaps between the respective pixel electrodes 213. A transparent aligning film 25 is formed on the black masks 524.

Each TFT 14 comprises a gate electrode 15 formed on the substrate 12, a transparent gate insulating film 16 consisting of SiN (silicon nitride) or the like and formed on almost the entire surface of the front substrate 12 to cover the gate electrode 15, an i-type semiconductor film 17 consisting of a-Si (amorphous silicon) or the like and formed on the gate insulating film 16 to oppose the gate electrode 15, and source and drain electrodes 19s and 19d formed on two side portions of the i-type semiconductor film 17 via n-type semiconductor films 18 consisting of impurity-doped a-Si or the like.

Reference numeral 20 denotes a blocking insulating film formed on the channel region of each i-type semiconductor film 17.

Although not shown, a gate line (address line) for supplying a gate signal to the gate electrode 15 of each TFT 14, and a data line for supplying a data signal corresponding to image data to the drain electrode 19d of the TFT 14 are arranged on the inner surface of the front substrate 12.

The above gate line is formed on the substrate 12 integrally with the gate electrode 15 of the TFT 14. This gate line is covered with the gate insulating film 16 except for the terminal portion. In addition, the above data line is formed on the gate insulating film 16 and is connected to the drain electrode 19d of the TFT 14.

The above pixel electrode 213 is formed on the gate insulating film 16 in correspondence with each TFT 14 described above. An end portion of each pixel electrode 213 is connected to the source electrode 19s of the corresponding TFT 14.

The above black mask 524 is constituted by an insulating member such as a black resin member. The black masks 524 are formed into a matrix pattern corresponding to the gaps between the respective pixel electrodes 213 arranged in the row and column directions in the form of a matrix, with an edge portion of each black mask 524 overlapping an edge portion of the corresponding pixel electrode 213 with a very small overlapping width. Note that the black mask 524 also serves as a protective film for the TFT 14.

The rear substrate 11 of the liquid crystal cell 10 is an insulating substrate (need not be transparent) constituted by a glass plate or the like. A counter electrode 624 is formed on the inner surface, i.e., the surface opposing the liquid crystal layer, of the rear substrate 11 to oppose all the pixel electrodes 213 on the front substrate 12. A transparent aligning film 23 is formed on the counter electrode 624.

The counter electrode 624 is an electrode in the form of a single film or divided films, which oppose all the pixel electrodes on the rear substrate 11. This counter electrode 624 consists of a metal film for reflecting light, e.g., an Al alloy having a high reflectance. That is, the pixel electrode 624 also serves as a reflecting film, with its front surface (reflecting surface) being formed into an almost mirror surface.

Although not shown, the rear and front substrates 11 and 12 are joined to each other at their outer peripheral portions via a frame-like seal member, and a liquid crystal 26 is filled in the area surrounded by the seal member between the substrates 11 and 12.

In the liquid crystal display device of the sixth embodiment, similar to the first embodiment, one pixel can display red, green, blue, and white in accordance with different applied voltages.

In the above liquid crystal display device, the counter electrode 624 formed on the inner surface of the rear substrate 11 of the liquid crystal cell 10 also serves as a reflecting film so that light can be reflected by the counter electrode 624 on the inner surface of the rear substrate 11 of the liquid crystal cell 10. For this reason, since light passes through only the front substrate 12 of the two substrates 11 and 12 of the liquid crystal cell 10, and only one polarizing plate 30 is used, the light amount loss due to light absorption in the substrates of the liquid crystal cell and the polarizing plate can be reduced.

In addition, in the above liquid crystal display device, since the black masks 524 are formed on the inner surface of the front substrate 12 of the liquid crystal cell 10 in correspondence with the gaps between the respective pixel electrodes 213 arranged on the substrate 12, the contrast between the respective pixels can be sharpened, and a high-quality image can be displayed.

Furthermore, since the front surface of the polarizing plate 30 serves as a light-scattering surface A, even if the reflecting surface of the counter electrode 624 is a mirror surface, an external image such as the face of a display observer or its background is not reflected in the reflecting surface.

[Seventh Embodiment]

In the sixth embodiment, the black masks 524 are formed on the inner surface of the front substrate 12 of the liquid crystal cell 10. These black masks 524 may be formed on the inner surface of the rear substrate 11 on which the counter electrode 624 is formed.

Figure 12:
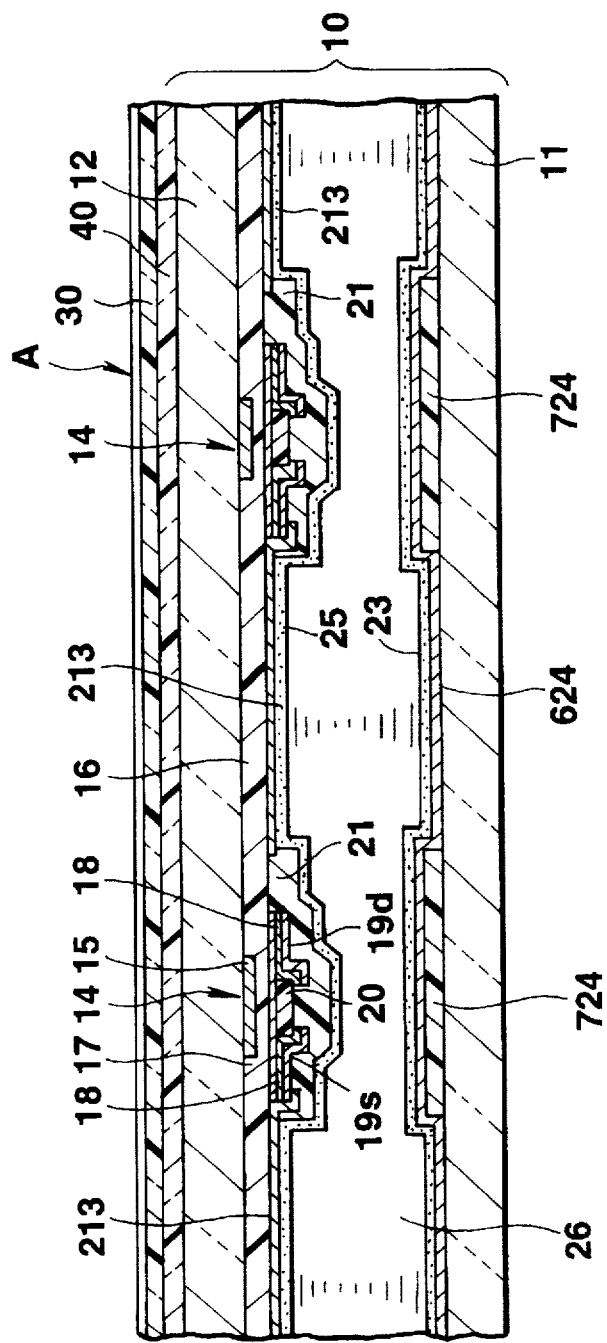
FIG. 12 is a sectional view showing part of a liquid crystal display device according to the seventh embodiment of the present invention.

FIG. 12 is a sectional view showing part of an active matrix liquid crystal display device according to the seventh embodiment of the present invention.

In the active matrix liquid crystal display device of this embodiment, black masks 724 are formed on the inner surface of a rear substrate 11 of a liquid crystal cell 10 in the form of a matrix pattern corresponding to the gaps between the respective pixel electrodes 213 arranged on a front substrate 12.

Each black mask 724 is made of a black resin or a metal film consisting of Cr or the like (a black resin in FIG. 12). A counter electrode 624 also serving as a reflecting film is formed on the black masks 724 to cover them.

In the liquid crystal display device of this embodiment, the black masks 724 are formed on the inner surface of the rear substrate 11 of the liquid crystal cell 10. Other arrangements are the same as those of the liquid crystal display device of the first embodiment. Therefore, the same reference numerals in FIG. 12 denote the same parts as FIG. 1, and a repetitive description will be avoided. Note that in this embodiment, the protective insulating films 21 used in the first embodiment are formed on the TFTs 14 arranged on the front substrate 12 of the liquid crystal cell 10 instead of the black masks 524 in the sixth embodiment.

[Eighth Embodiment]

In each of the first to seventh embodiments described above, each reflecting member is constituted by an electrode made of a metal film, and this electrode has mirror surface reflection characteristics. In order to prevent reflection of an image of an observer in the liquid crystal display device, the light-scattering surface is formed on the front surface of the polarizing plate. However, the present invention is not limited to this. For example, the front surface of each reflecting member may have light-scattering characteristics.

Figure 13:
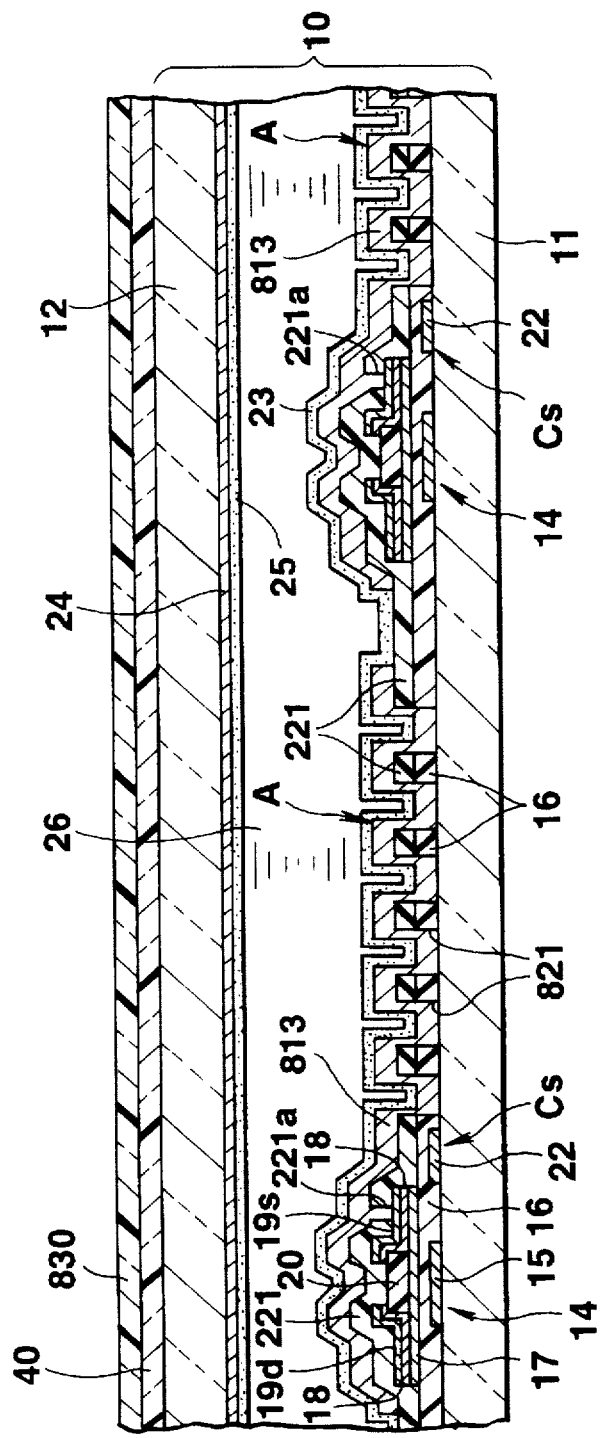
FIG. 13 is a sectional view showing part of a liquid crystal display device according to the eighth embodiment of the present invention.

FIG. 13 is a sectional view showing part of a liquid crystal display device according to the eighth embodiment of the present invention. In this liquid crystal display device, light-scattering characteristics are provided for each pixel electrode formed on the rear substrate of the liquid crystal cell to be connected to a corresponding TFT. Other arrangements are the same as those of the second embodiment described above. The same reference numerals in the eighth embodiment denote the same parts as in the second embodiment, and a description thereof will be omitted.

The liquid crystal display device of this embodiment comprises an active matrix liquid crystal cell 10, one polarizing plate 830 having a smooth surface, and one retardation plate 40. The polarizing plate 830 is arranged on the front surface side of the liquid crystal cell 10, whereas the retardation plate 40 is arranged between the liquid crystal cell 10 and the polarizing plate 830.

Of a pair of substrates 11 and 12 opposing each other through the liquid crystal layer of the liquid crystal cell 10, the rear substrate 11 is an insulating substrate (need not be transparent) constituted by a glass plate. A plurality of pixel electrodes 813 and a plurality of TFTs 14 corresponding to the respective pixel electrodes 813 are arranged on the inner surface, i.e., the surface opposing the liquid crystal layer, of the rear substrate 11 in the row and column directions in the form of a matrix. A transparent aligning film 23 is formed on the resultant structure.

The pixel electrodes 813 are formed on protective insulating films 221 to cover the TFTs 14. Each pixel electrode 813 is connected to a source electrode 19s of the corresponding TFT 14 via a contact hole 221a formed in the corresponding protective insulating film 221.

This pixel electrode 813 consists of a metal film for reflecting light, e.g., an Al alloy having a high reflectance. The front surface of the pixel electrode 813 serves as a light-scattering surface A having small corrugations.

Figure 14:
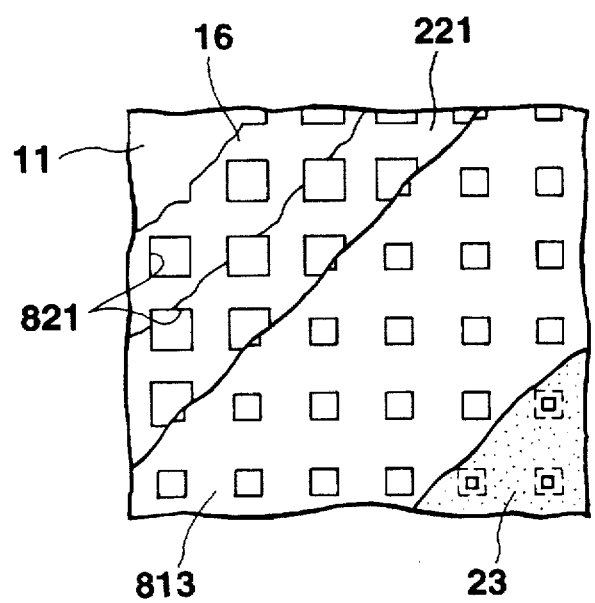
FIG. 14 is an enlarged plan view showing a pixel electrode of the liquid crystal display device in FIG. 13.

FIG. 14 is a plan view showing a portion of the pixel electrode 813. This pixel electrode 813 is formed by the following method. A large number of small holes (almost square in FIG. 14) 821 are formed in the protective insulating film 221 and a gate insulating film 16 formed thereunder throughout almost the entire area of a portion where the pixel electrode 813 is formed, except for a portion corresponding to the TFT 14, at small intervals (by a photolithographic method), thereby forming an underlying surface having small corrugations. A metal film consisting of the above-mentioned Al alloy or the like is formed on this underlying surface by a sputtering apparatus. This metal film is then patterned by a photolithographic method.

That is, the above pixel electrode 813 is constituted by the metal film having projecting portions (portions formed on the substrate 11) corresponding to the small holes 821 formed in the protective insulating film 221 and the gate insulating film 16, and this uneven front surface serves as a light-scattering surface A.

Although the small holes 821 are not formed in a portion, of the protective insulating film 221, which is located above the TFT 14, the film surface, of the protective insulating film 221, which is located above the TFT 14 is an uneven surface corresponding to level differences of the front surface of the TFT 14 (level differences between portions of source and drain electrodes 19s and 19d on a blocking insulating film 20 and the remaining portions, level differences between the surfaces of the electrodes 19s and 19d and the surface of the blocking insulating film 20, and the like). Therefore, the front surface of the portion, of the pixel electrode 813, which covers the TFT 14 also serves as the light-scattering surface A having small corrugations.

A capacitor electrode 22 is formed on the rear substrate 11 to oppose each pixel electrode 813 through the gate insulating film 16 and the protective insulating film 221. A compensation capacitor (storage capacitor) Cs for compensating for the voltage held in the pixel during a non-selection period is constituted by this capacitor electrode 22, the pixel electrode 813, and the insulating films 16 and 221 formed therebetween. Although not shown, a capacitor line integrally formed with the capacitor electrode 22 is arranged on the rear substrate 11. Each capacitor electrode 22 is connected to a reference potential via the capacitor line.

The front substrate 12 of the liquid crystal cell 10 is a transparent substrate (glass plate in FIG. 13) constituted by a glass plate, a transparent resin film, or the like. A transparent counter electrode 24 in the form of a single film or divided films is formed on the inner surface, i.e., the surface opposing the liquid crystal layer, of the front substrate 12 to oppose all the pixel electrodes 813 arranged on the rear substrate 11. A transparent aligning film 25 is formed on the counter electrode 24.

Although not shown, the rear and front substrates 11 and 12 are joined to each other at their outer peripheral portions via a frame-like seal member. A liquid crystal 26 is filled in the area surrounded by the seal member between the two substrates 11 and 12.

In the liquid crystal display device of the eighth embodiment, similar to the first embodiment, one pixel can display red, green, blue, and white.

In the above liquid crystal display device, the front surface of each pixel electrode 813 also serving as a reflecting film is formed into the light-scattering surface A. This arrangement prevents an external image such as the face of a display observer or its background from being reflected in the reflecting surface and overlapping a display image, i.e., reflection of an external image.

That is, the above liquid crystal display device is designed to color light without using any color filters. In such a device, since the transmittance is high, if a reflecting surface is a mirror surface, an external image such as the face of a display observer or its background is reflected in the reflecting surface to overlap a display image. As described above, however, the front surface of each pixel electrode 813 also serving as a reflecting film serves as the light-scattering surface A, no reflection of an external image occurs.

If the scattering effect of the light-scattering surface A is excessively large, light is scattered greatly, resulting in an unclear display image. If the scattering effect is small, reflection of an external image occurs. Therefore, the sizes of the corrugations of the light-scattering surface A, i.e., the widths and pitch of the corrugations, are set to obtain a proper scattering effect that can prevent reflection of an external image without making a display image unclear.

In the above liquid crystal display device, since the TFTs 14 arranged on the inner surface of the rear substrate 11 of the liquid crystal cell 10 are covered with protective insulating films 221, and the pixel electrodes 813 also serving as reflecting films are formed on the protective insulating films 221 to cover the TFTs 14, the opening ratio can be increased by increasing the area of each pixel electrode 813.

In addition, in the above liquid crystal display device, since the pixel electrodes 813 formed on the inner surface of the liquid crystal cell 10 also serve as reflecting films, any other special reflecting film is not required. Furthermore, since each pixel electrode 813 is formed by forming a metal film on an underlying film having small corrugations, the pixel electrode 813 whose front surface is formed into a scattering/reflecting surface having small corrugations can be easily formed to reduce the manufacturing cost of the liquid crystal cell 10. Therefore, a reduction in the cost of the liquid crystal display device can be attained.

In the above embodiment, in order to increase the opening ratio of the liquid crystal display device, the protective insulating films 221 covering the TFTs 14 arranged on the rear substrate 11 of the liquid crystal cell 10 is formed on almost the entire surface of the rear substrate 11, and the pixel electrodes 813 also serving as reflecting films are formed on the protective insulating films 221 to cover the TFTs 14. If, however, the opening ratio need not be increased much, the pixel electrodes 813 may be formed on the sides of the TFTs 14 instead of being formed thereon. In this case, as in the first embodiment, the protective insulating films 221 may be formed on only portions corresponding to the TFTs 14, the pixel electrodes 813 may be formed on the gate insulating films 16, and one side edge portion of each pixel electrode may be connected to the source electrode 19s of the corresponding TFT 14.

In this case, a large number of small holes 22 may be formed in each gate insulating film 16 to form an underlying surface having small corrugations, and a metal film may be formed on the underlying surface, thereby forming the pixel electrode 813 whose front surface is formed into the light-scattering surface A having small corrugations.

In addition, according to the above embodiment, in the liquid crystal cell 10, the pixel electrodes 813 and the TFTs 14 are formed on the rear substrate 11. However, in this liquid crystal cell 10, pixel electrodes and TFTs may be arranged on the inner surface of the front substrate, and a counter electrode may be formed on the inner surface of the rear substrate. In this case, the pixel electrodes arranged on the front substrate may be constituted by transparent conductive films, and the counter electrode arranged on the rear substrate may be constituted by a metal film which reflects light, with the front surface of the counter electrode being formed into a scattering/reflecting surface.

In this case, for example, the counter electrode may be formed by coarsening/etching the inner surface of the rear substrate to form an underlying surface having small corrugations, and forming a metal film on the underlying surface.

In the above embodiment, as the liquid crystal cell 10, the active matrix cell using the TFTs 14 as active elements is used. However, this liquid crystal cell may be an active matrix cell using two-terminal nonlinear resistive elements such as MIMs or thin-film diodes. Also, the twist angle of the liquid crystal molecules is not limited to 90°. For example, the twist angle may be 180° to 270°. Furthermore, the liquid crystal cell 10 may be set in an aligned state based on homogeneous alignment, homeotropic alignment, or hybrid alignment.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A liquid crystal display device comprising:

a pair of substrates including first and second substrates arranged to oppose each other;

a plurality of pixel electrodes operatively coupled to an inner surface of the first substrate of said pair of substrates in the form of a matrix such that said plurality of pixel electrodes are interposed between said pair of substrates;

active elements operatively coupled to the inner surface of said first substrate;

at least one counter electrode formed on an inner surface of the second substrate of said pair of substrates such that said at least one counter electrode is interposed between said pair of substrates to substantially oppose said pixel electrodes;

a compensation capacitor operatively coupled to the inner surface of one of said pair of substrates and coupled to said active elements so as to be substantially parallel with said pixel electrodes, the compensation capacitor compensating for variations in voltages applied between said pixel electrodes and said counter electrode;

aligning films respectively operatively coupled to the inner surface of said first substrate and the inner surface of said second substrate so as to cover said plurality of pixel electrodes;

a liquid crystal layer operatively positioned between said first and second substrates and having an initial aligned state in which liquid crystal molecules are aligned in a predetermined direction by said aligning film;

at least one polarizing member arranged so as to be non-interposed between said pair of substrates such that a transmission axis of said at least one polarizing member intersects an aligning direction of liquid crystal molecules adjacent to said aligning film formed on an adjacent substrate side at an angle other than a right angle, for coloring light which passes through said liquid crystal display by controlling a birefringence effect of the liquid crystal layer; and a reflecting member, arranged on a substrate side where light incident from the polarizing member side of one of said pair of substrate emerges, for reflecting light transmitted through said liquid crystal layer.

2. A device according to claim 1, wherein said compensation capacitor comprises:

a pixel electrode;

a capacitor electrode arranged to oppose said pixel electrode; and an insulating film interposed between said pixel electrode and said capacitor electrode.

3. A device according to claim 2, wherein said pixel electrode comprises a transparent conductive film;

said compensation capacitor further comprises a metal film capacitor electrode having light-reflecting characteristics; and wherein, said capacitor electrode is utilized as a reflecting member.

4. A device according to claim 1, wherein said reflecting member comprises a metal film having a specular reflecting surface.

5. A device according to claim 1, wherein said polarizing member comprises a light-scattering film, said light-scattering film dispersing light transmitted therethrough.

6. A device according to claim 1, further comprising a retardation plate operatively interposed between said polarizing member and said second substrate such that an optical axis of said retardation plate is non-perpendicular to an optical axis of said polarizing member.

7. A device according to claim 1, wherein said reflecting member is operatively coupled to the inner surface of said first substrate opposite said second substrate on which light is incident.

8. A device according to claim 1, further comprising a protective film covering said active element, said active element comprising a gate electrode formed on said substrate, a gate insulating film formed on almost an entire surface of said substrate to cover said gate electrode, a semiconductor film formed to oppose said gate electrode, and source and drain electrodes formed on two ends of said semiconductor film to be separated from each other, and wherein said compensation capacitor means comprises a capacitor electrode formed on said gate insulating film, said pixel electrode, and a protective film extending between said capacitor electrode and said pixel electrode and covering said active element.

9. A device according to claim 1, wherein said active element comprises a gate electrode formed on said substrate, a gate insulating film formed on almost an entire surface of said substrate to cover said gate electrode, a semiconductor film formed to oppose said gate electrode, and source and drain electrodes formed on two ends of said semiconductor film to be separated from each other, and said compensation capacitor means comprises a first capacitor electrode formed on said substrate, a gate insulating film covering said first capacitor electrode, and a second capacitor electrode formed on said gate insulating film and connected to one of said source and drain electrodes to which said pixel electrode is connected.

10. A device according to claim 7, wherein said plurality of pixel electrodes, said active elements, and said compensation capacitor are operatively coupled to the inner surface of said first substrate opposite said second substrate on which light is incident.

11. A device according to claim 10, wherein said pixel electrode comprises a specular metal film which is capable of reflecting light.

12. A device according to claim 10, wherein each of said plurality of pixel electrodes has a reflecting surface including specular reflecting surface portions and light-scattering portions, each of said plurality of pixel electrodes also having a reflecting member.

13. A device according to claim 7, wherein said plurality of pixel electrodes, said active elements, and said compensation capacitor are operatively coupled to the inner surface of one of said pair of substrates on which light is incident, and wherein a metal film counter electrode having light-reflecting characteristics is operatively coupled to the inner surface of said other substrate to substantially oppose said pixel electrodes.

14. A liquid crystal display device comprising:

a first substrate having a surface on which a transparent electrode and a first aligning film covering said transparent electrode are operatively coupled;

a second substrate having an electrode operatively coupled thereto to oppose said first substrate, and a second aligning film covering said electrode, said second electrode having a plurality of pixels operatively coupled to an inner surface thereof in an area opposing said transparent electrode;

a liquid crystal layer interposed between said first and second substrates and having an initial aligned state in which liquid crystal molecules are aligned in a predetermined direction by said first and second aligning films;

a polarizing member being non-interposed between said first and second substrates such that a polarization axis of said polarizing member non-perpendicularly intersects an aligning direction of liquid crystal molecules adjacent to said first aligning film, for coloring light which passes through said liquid crystal display by controlling a birefringence effect of the liquid crystal layer;

a reflecting member arranged on a side of the second substrate for reflecting light which is incident on said polarizing member and transmitted through said liquid crystal layer; and light-shielding members arranged on an inner surface of one of said first and second substrates, for preventing leakage of light between said plurality of pixels.

15. A device according to claim 14, wherein said light-shielding members are operatively coupled to the inner surface of said first substrate.

16. A device according to claim 14, wherein said light-shielding members are operatively coupled to the inner surface of said second substrate.

17. A device according to claim 14, further comprising a plurality of pixel electrodes and a plurality of active elements respectively corresponding to said plurality of pixel electrodes and being arranged in matrix form on a surface of said second substrate which opposes said first substrate, and at least one counter electrode opposing said plurality of pixel electrodes and being operatively coupled to the surface of said first substrate which opposes said second substrate.

18. A device according to claim 14, further comprising a plurality of pixel electrodes and a plurality of active elements respectively corresponding to said plurality of pixel electrodes and being arranged in matrix form on a surface of said first substrate which opposes said second substrate, and at least one counter electrode opposing said plurality of pixel electrodes and being operatively coupled to the surface of said second substrate which opposes said first substrate.

19. A device according to claim 14, wherein one of said first and second substrates includes a plurality of pixel electrodes arranged in matrix form on the inner surface thereof, and wherein the device further comprises a plurality of active elements respectively corresponding to said plurality of pixel electrodes, and a compensation capacitor operatively connected to said active elements so as to be parallel with said pixel electrodes, the compensation capacitor compensating for variations in voltages applied between said plurality of pixel electrodes and said counter electrode.

20. A device according to claim 19, wherein said compensation capacitor comprises a pixel electrode and a capacitor electrode arranged so as to oppose said pixel electrode through an insulating film.

21. A device according to claim 14, wherein said electrode on said second substrate includes a reflecting surface having a specular reflecting surface portion, a light-scattering portion, and a reflecting member.

22. A device according to claim 14, wherein said polarizing member comprises a light-scattering film on a surface thereof, and wherein said light-scattering film scatters light transmitted therethrough.

23. A device according to claim 14, further comprising a retardation plate interposed between said polarizing member and said substrate such that a direction of an optical axis of said retardation plate non-perpendicularly intersects a direction of an optical axis of said polarizing member.

* * * * *